United States Patent
Wray et al.

(10) Patent No.: US 11,921,506 B2
(45) Date of Patent: Mar. 5, 2024

(54) BELIEF STATE DETERMINATION FOR REAL-TIME DECISION-MAKING

(71) Applicants: Nissan North America, Inc., Franklin, TN (US); The University of Massachusetts, Boston, MA (US)

(72) Inventors: Kyle Hollins Wray, Mountain View, CA (US); Stefan Witwicki, San Carlos, CA (US); Shlomo Zilberstein, Amherst, MA (US)

(73) Assignees: Nissan North America, Inc., Franklin, TN (US); The University of Massachusetts, Boston, MA (US)

( * ) Notice: Subject to any disclaimer, the term of this patent is extended or adjusted under 35 U.S.C. 154(b) by 207 days.

(21) Appl. No.: 17/333,585

(22) Filed: May 28, 2021

(65) Prior Publication Data

US 2022/0382279 A1 Dec. 1, 2022

(51) Int. Cl.
*G05D 1/00* (2006.01)
*B60W 30/18* (2012.01)
*B60W 60/00* (2020.01)

(52) U.S. Cl.
CPC ..... *G05D 1/0088* (2013.01); *B60W 30/18159* (2020.02); *B60W 60/0027* (2020.02); *B60W 2554/4045* (2020.02)

(58) Field of Classification Search
CPC .. G05D 1/0088; G05D 1/0221; G05D 1/0219; B60W 30/18159; B60W 30/09;

(Continued)

(56) References Cited

U.S. PATENT DOCUMENTS

2016/0161270 A1* 6/2016 Okumura ......... G08G 1/096725
  701/23
2016/0275797 A1* 9/2016 Lefevre .................. G08G 1/166
(Continued)

FOREIGN PATENT DOCUMENTS

EP  3552904 A1 * 10/2019  ............ B60W 40/04

OTHER PUBLICATIONS

C. Hubmann, M. Becker, D. Althoff, D. Lenz and C. Stiller, "Decision making for autonomous driving considering interaction and uncertain prediction of surrounding vehicles," 2017 IEEE Intelligent Vehicles Symposium (IV), Los Angeles, CA, USA, 2017, pp. 1671-1678, doi: 10.1109/IVS.2017.7995949. (Year: 2017).*

(Continued)

*Primary Examiner* — Elaine Gort
*Assistant Examiner* — Ellis B. Ramirez
(74) *Attorney, Agent, or Firm* — Young Basile Hanlon & MacFarlane, P.C.

(57) ABSTRACT

Real-time decision-making for a vehicle using belief state determination is described. Operational environment data is received while the vehicle is traversing a vehicle transportation network, where the data includes data associated with an external object. An operational environment monitor establishes an observation that relates the object to a distinct vehicle operation scenario. A belief state model of the monitor computes a belief state for the observation directly from the operational environment data. The monitor provides the computed belief state to a decision component implementing a policy that maps a respective belief state for the object within the distinct vehicle operation scenario to a respective candidate vehicle control action. A candidate vehicle control action is received from the policy of the decision component, and a vehicle control action is selected (Continued)

for traversing the vehicle transportation from any available candidate vehicle control actions.

20 Claims, 6 Drawing Sheets

(58) Field of Classification Search
CPC ......... B60W 30/0953; B60W 60/0027; B60W 2554/4045; B60W 50/06; B60W 50/0098; B60W 60/001; G01C 21/34; G05B 23/024; G08G 1/166; G06F 40/186; G06F 40/56
USPC .......................... 701/27, 41; 706/12, 15, 21
See application file for complete search history.

(56) References Cited

U.S. PATENT DOCUMENTS

| | | | | |
|---|---|---|---|---|
| 2017/0101093 | A1* | 4/2017 | Barfield, Jr. | G08G 1/09675 |
| 2018/0373245 | A1* | 12/2018 | Nishi | G08G 1/161 |
| 2019/0113918 | A1* | 4/2019 | Englard | G06N 5/046 |
| 2019/0295179 | A1* | 9/2019 | Shalev-Shwartz | G07C 5/02 |
| 2019/0310654 | A1* | 10/2019 | Halder | G05D 1/0088 |
| 2020/0005645 | A1* | 1/2020 | Wray | B60W 30/18159 |
| 2020/0097003 | A1* | 3/2020 | Wray | G05D 1/0088 |
| 2020/0159213 | A1* | 5/2020 | Svegliato | B60W 50/029 |
| 2020/0189581 | A1* | 6/2020 | Yang | B60W 40/04 |

OTHER PUBLICATIONS

C. Hubmann, J. Schulz, M. Becker, D. Althoff and C. Stiller, "Automated Driving in Uncertain Environments: Planning With Interaction and Uncertain Maneuver Prediction," in IEEE Transactions on Intelligent Vehicles, vol. 3, No. 1, pp. 5-17, Mar. 2018, doi: 10.1109/TIV.2017.2788208. (Year: 2018).*

Spaan et al., Perseus: Randomized Point-based Value Iteration for POMDPs; Journal of Artificial Intelligence Research, vol. 24, pp. 195-220, 2005.

Wray et al., "POMDPs for Safe Visibility Reasoning in Autonomous Vehicles", RSS 2020 Workshop on Interaction and Decision-Making in Autonomous-Driving, Jul. 13, 2020 (Virtual Workshop), 5 pgs.

* cited by examiner

BELIEF STATE DETERMINATION FOR REAL-TIME DECISION-MAKING

TECHNICAL FIELD

This disclosure relates generally to vehicle operational management and driving, and more particularly to real-time or near real-time decision-making of an autonomous or semi-autonomous vehicle.

BACKGROUND

A vehicle may traverse a portion of a vehicle transportation network (e.g., a road). Traversing the portion of the vehicle transportation network may include generating or capturing, such as by a sensor of the vehicle, data, such as data representing an operational environment, or a portion thereof, of the vehicle. Traversing the portion of the vehicle transportation network may include performing an action of autonomous driving in response to the captured data. The action may be selected using artificial intelligence (e.g., trained machine-learning models) or other decision-making models.

SUMMARY

Disclosed herein are aspects, features, elements, implementations, and embodiments using belief state determination for real-time decision-making while a vehicle is traveling through a vehicle transportation network.

An aspect of the disclosed embodiments is an apparatus for real-time decision-making for a vehicle using belief state determination. A processor may be configured to receive, while the vehicle is traversing the vehicle transportation network, operational environment data, wherein the operational environment data includes data associated with an object external to the vehicle, to establish, using an operational environment monitor, an observation that relates the object to a distinct vehicle operation scenario, compute, using a belief state model of the operational environment monitor, a belief state for the observation directly from the operational environment data, provide, from the operational environment monitor, the computed belief state to a decision component implementing a policy that maps a respective belief state for the object within the distinct vehicle operation scenario to a respective candidate vehicle control action, receive, from the policy of the decision component, a candidate vehicle control action, and select, for traversing the vehicle transportation network, a vehicle control action from any available candidate vehicle control actions.

Another aspect of the disclosed embodiments is a method for real-time decision-making for a vehicle using belief state determination. The method may include receiving, while the vehicle is traversing a vehicle transportation network, operational environment data, wherein the operational environment data includes data associated with an object external to the vehicle, establishing, using an operational environment monitor, an observation that relates the object to a distinct vehicle operation scenario, and computing, using a belief state model of the operational environment monitor, a belief state for the observation directly from the operational environment data. The method may further include providing, from the operational environment monitor, the computed belief state to a decision component implementing a policy that maps a respective belief state for the object within the distinct vehicle operation scenario to a respective candidate vehicle control action, receiving, from the policy of the decision component, a candidate vehicle control action, and selecting, for traversing the vehicle transportation network, a vehicle control action from any available candidate vehicle control actions.

Yet another aspect of the disclosed embodiments is a vehicle implementing real-time decision-making using belief state determination. The vehicle includes a processor. The processor may be configured to receive, while the vehicle is traversing the vehicle transportation network, operational environment data, wherein the operational environment data includes data associated with an object external to the vehicle, to establish, using an operational environment monitor, an observation that relates the object to a distinct vehicle operation scenario, compute, using a belief state model of the operational environment monitor, a belief state for the observation directly from the operational environment data, provide, from the operational environment monitor, the computed belief state to a decision component implementing a policy that maps a respective belief state for the object within the distinct vehicle operation scenario to a respective candidate vehicle control action, receive, from the policy of the decision component, a candidate vehicle control action, and select, for traversing the vehicle transportation network, a vehicle control action from any available candidate vehicle control actions.

Variations in these and other aspects, features, elements, implementations, and embodiments of the methods, apparatus, procedures, and algorithms disclosed herein are described in further detail hereafter.

BRIEF DESCRIPTION OF THE DRAWINGS

The various aspects disclosed herein will become more apparent by referring to the examples provided in the following description and drawings in which like reference numbers refer to like elements.

DETAILED DESCRIPTION

A vehicle, such as an autonomous vehicle (AV), or a semi-autonomous vehicle, may traverse a portion of a vehicle transportation network. The vehicle may include one or more sensors and traversing the vehicle transportation network may include the sensors generating or capturing sensor data, such as sensor data corresponding to an operational environment of the vehicle, or a portion thereof. For example, the sensor data may include information corresponding to one or more external objects, such as pedestrians, remote vehicles, other objects within the vehicle operational environment, vehicle transportation network geometry, or a combination thereof. As used herein, an AV encompasses a semi-autonomous vehicle.

During autonomous driving, and at different time steps (e.g., at every time step), some component (e.g., a decision-making module or model such as a reasoning module, an inference module, or the like) of the AV may determine a respective action for controlling the AV in response to sensor information. Thus, at a high level, the component of the AV uses inputs (e.g., sensor data) and produces an output (e.g., the action to control the AV) where the output can be an action for controlling the AV.

The component can be a single component (e.g., module, model, circuitry, etc.), multiple cooperating components, or a command arbitration module (e.g., an executor or an autonomous vehicle operational management controller) that receives inputs (e.g., candidate actions) from multiple components and selects one of the candidate actions as the selected action for controlling the AV.

Certain of the components may be referred to as decision components herein. Each decision component recommends an action based on a belief state of the operational environment of the vehicle (e.g., a state based on the locations of objects and the AV, headings, speed, etc.), which belief state is described in additional detail below with regards to FIG. 3. The decision component may explicitly maintain the belief state. In such an implementation, the belief state is updated using the current belief state, an observation made (e.g., by an observation monitor or model), and the selected action. During real-time decision-making, the decision component explicitly maintaining the belief state can cause problems with suggesting a candidate action, which problems are discussed in more detail below after an initial description of a vehicle with which the invention may be used.

Figure 1:
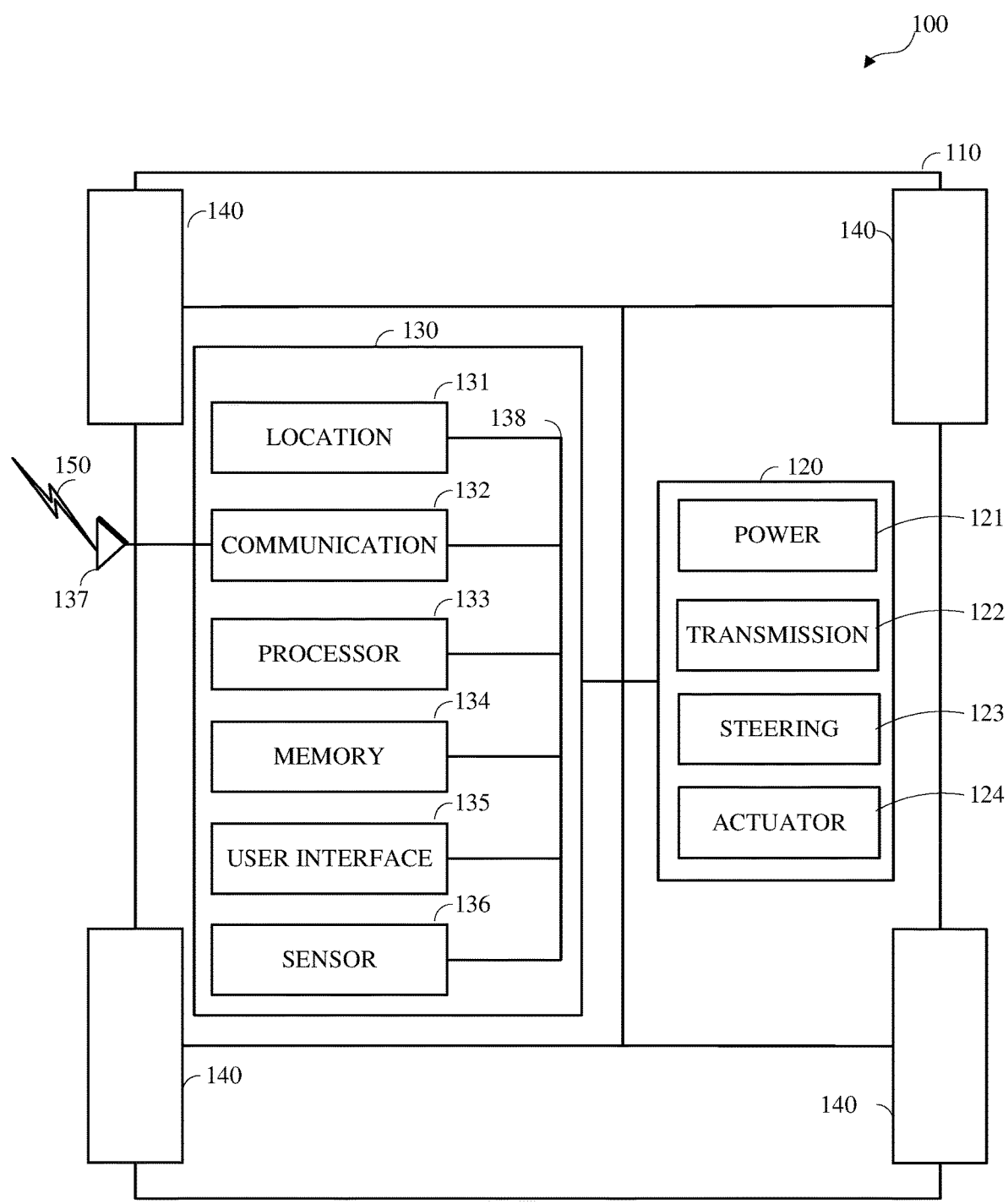
FIG. 1 is a diagram of an example of a vehicle in which the aspects, features, and elements disclosed herein may be implemented.

FIG. 1 is a diagram of an example of a vehicle in which the aspects, features, and elements disclosed herein may be implemented. As shown, a vehicle 100 includes a chassis 110, a powertrain 120, a controller 130, and wheels 140. Although the vehicle 100 is shown as including four wheels 140 for simplicity, any other propulsion device or devices, such as a propeller or tread, may be used. In FIG. 1, the lines interconnecting elements, such as the powertrain 120, the controller 130, and the wheels 140, indicate that information, such as data or control signals, power, such as electrical power or torque, or both information and power, may be communicated between the respective elements. For example, the controller 130 may receive power from the powertrain 120 and may communicate with the powertrain 120, the wheels 140, or both, to control the vehicle 100, which may include accelerating, decelerating, steering, or otherwise controlling the vehicle 100.

As shown, the powertrain 120 includes a power source 121, a transmission 122, a steering unit 123, and an actuator 124. Other elements or combinations of elements of a powertrain, such as a suspension, a drive shaft, axles, or an exhaust system may be included. Although shown separately, the wheels 140 may be included in the powertrain 120.

The power source 121 may include an engine, a battery, or a combination thereof. The power source 121 may be any device or combination of devices operative to provide energy, such as electrical energy, thermal energy, or kinetic energy. For example, the power source 121 may include an engine, such as an internal combustion engine, an electric motor, or a combination of an internal combustion engine and an electric motor, and may be operative to provide kinetic energy as a motive force to one or more of the wheels 140. The power source 121 may include a potential energy unit, such as one or more dry cell batteries, such as nickel-cadmium (NiCd), nickel-zinc (NiZn), nickel metal hydride (NiMH), lithium-ion (Li-ion); solar cells; fuel cells; or any other device capable of providing energy.

The transmission 122 may receive energy, such as kinetic energy, from the power source 121, and may transmit the energy to the wheels 140 to provide a motive force. The transmission 122 may be controlled by the controller 130 the actuator 124 or both. The steering unit 123 may be controlled by the controller 130 the actuator 124 or both and may control the wheels 140 to steer the vehicle. The actuator 124 may receive signals from the controller 130 and may actuate or control the power source 121, the transmission 122, the steering unit 123, or any combination thereof to operate the vehicle 100.

As shown, the controller 130 may include a location unit 131, an electronic communication unit 132, a processor 133, a memory 134, a user interface 135, a sensor 136, an electronic communication interface 137, or any combination thereof. Although shown as a single unit, any one or more elements of the controller 130 may be integrated into any number of separate physical units. For example, the user interface 135 and the processor 133 may be integrated in a first physical unit and the memory 134 may be integrated in a second physical unit. Although not shown in FIG. 1, the controller 130 may include a power source, such as a battery. Although shown as separate elements, the location unit 131, the electronic communication unit 132, the processor 133, the memory 134, the user interface 135, the sensor 136, the electronic communication interface 137, or any combination thereof may be integrated in one or more electronic units, circuits, or chips.

The processor 133 may include any device or combination of devices capable of manipulating or processing a signal or other information now-existing or hereafter developed, including optical processors, quantum processors, molecular processors, or a combination thereof. For example, the processor 133 may include one or more special purpose processors, one or more digital signal processors, one or more microprocessors, one or more controllers, one or more microcontrollers, one or more integrated circuits, one or more Application Specific Integrated Circuits, one or more Field Programmable Gate Array, one or more programmable logic arrays, one or more programmable logic controllers, one or more state machines, or any combination thereof. The processor 133 may be operatively coupled with the location unit 131, the memory 134, the electronic communication interface 137, the electronic communication unit 132, the user interface 135, the sensor 136, the powertrain 120, or any combination thereof. For example, the processor may be operatively coupled with the memory 134 via a communication bus 138.

The memory 134 may include any tangible non-transitory computer-usable or computer-readable medium, capable of, for example, containing, storing, communicating, or transporting machine readable instructions, or any information associated therewith, for use by or in connection with the processor 133. The memory 134 may be, for example, one or more solid state drives, one or more memory cards, one or more removable media, one or more read-only memories, one or more random access memories, one or more disks, including a hard disk, a floppy disk, an optical disk, a magnetic or optical card, or any type of non-transitory media suitable for storing electronic information, or any combination thereof.

The communication interface 137 may be a wireless antenna, as shown, a wired communication port, an optical communication port, or any other wired or wireless unit capable of interfacing with a wired or wireless electronic communication medium 150. Although FIG. 1 shows the communication interface 137 communicating via a single communication link, a communication interface may be configured to communicate via multiple communication links. Although FIG. 1 shows a single communication interface 137, a vehicle may include any number of communication interfaces.

The communication unit 132 may be configured to transmit or receive signals via a wired or wireless electronic communication medium 150, such as via the communication interface 137. Although not explicitly shown in FIG. 1, the communication unit 132 may be configured to transmit, receive, or both via any wired or wireless communication medium, such as radio frequency (RF), ultraviolet (UV), visible light, fiber optic, wireline, or a combination thereof. Although FIG. 1 shows a single communication unit 132 and a single communication interface 137, any number of communication units and any number of communication interfaces may be used. In some embodiments, the communication unit 132 may include a dedicated short-range communications (DSRC) unit, an on-board unit (OBU), or a combination thereof.

The location unit 131 may determine geolocation information, such as longitude, latitude, elevation, direction of travel, or speed, of the vehicle 100. For example, the location unit may include a global positioning system (GPS) unit, such as a Wide Area Augmentation System (WAAS) enabled National Marine-Electronics Association (NMEA) unit, a radio triangulation unit, or a combination thereof. The location unit 131 can be used to obtain information that represents, for example, a current heading of the vehicle 100, a current position of the vehicle 100 in two or three dimensions, a current angular orientation of the vehicle 100, or a combination thereof.

The user interface 135 may include any unit capable of interfacing with a person, such as a virtual or physical keypad, a touchpad, a display, a touch display, a heads-up display, a virtual display, an augmented reality display, a haptic display, a feature tracking device, such as an eye-tracking device, a speaker, a microphone, a video camera, a sensor, a printer, or any combination thereof. The user interface 135 may be operatively coupled with the processor 133, as shown, or with any other element of the controller 130. Although shown as a single unit, the user interface 135 may include one or more physical units. For example, the user interface 135 may include an audio interface for performing audio communication with a person and a touch display for performing visual and touch-based communication with the person. The user interface 135 may include multiple displays, such as multiple physically separate units, multiple defined portions within a single physical unit, or a combination thereof.

The sensor 136 may include one or more sensors, such as an array of sensors, which may be operable to provide information that may be used to control the vehicle. The sensors 136 may provide information regarding current operating characteristics of the vehicle 100. The sensor 136 can include, for example, a speed sensor, acceleration sensors, a steering angle sensor, traction-related sensors, braking-related sensors, steering wheel position sensors, eye tracking sensors, seating position sensors, or any sensor, or combination of sensors, operable to report information regarding some aspect of the current dynamic situation of the vehicle 100.

The sensor 136 may include one or more sensors operable to obtain information regarding the physical environment surrounding the vehicle 100. For example, one or more sensors may detect road geometry and features, such as lane lines, and obstacles, such as fixed obstacles, vehicles, and pedestrians. The sensor 136 can be or include one or more video cameras, laser-sensing systems, infrared-sensing systems, acoustic-sensing systems, or any other suitable type of on-vehicle environmental sensing device, or combination of devices, now known or later developed. In some embodiments, the sensors 136 and the location unit 131 may be a combined unit.

Although not shown separately, the vehicle 100 may include a trajectory controller. For example, the controller 130 may include the trajectory controller. The trajectory controller may be operable to obtain information describing a current state of the vehicle 100 and a route planned for the vehicle 100, and, based on this information, to determine and optimize a trajectory for the vehicle 100. In some embodiments, the trajectory controller may output signals operable to control the vehicle 100 such that the vehicle 100 follows the trajectory that is determined by the trajectory controller. For example, the output of the trajectory controller can be an optimized trajectory that may be supplied to the powertrain 120, the wheels 140, or both. In some embodiments, the optimized trajectory can be control inputs such as a set of steering angles, with each steering angle corresponding to a point in time or a position. In some embodiments, the optimized trajectory can be one or more paths, lines, curves, or a combination thereof.

One or more of the wheels 140 may be a steered wheel, which may be pivoted to a steering angle under control of the steering unit 123, a propelled wheel, which may be torqued to propel the vehicle 100 under control of the transmission 122, or a steered and propelled wheel that may steer and propel the vehicle 100.

A vehicle may include units, or elements, not expressly shown in FIG. 1, such as an enclosure, a Bluetooth® module, a frequency modulated (FM) radio unit, a Near Field Communication (NFC) module, a liquid crystal display (LCD) display unit, an organic light-emitting diode (OLED) display unit, a speaker, or any combination thereof.

The vehicle 100 may be an autonomous vehicle controlled autonomously, without direct human intervention, to traverse a portion of a vehicle transportation network. Although not shown separately in FIG. 1, an autonomous vehicle may include an autonomous vehicle control unit, which may perform autonomous vehicle routing, navigation, and control. The autonomous vehicle control unit may be integrated with another unit of the vehicle. For example, the controller 130 may include the autonomous vehicle control unit. The teachings herein are equally applicable to a semi-autonomous vehicle.

The autonomous vehicle control unit may control or operate the vehicle 100 to traverse a portion of the vehicle transportation network in accordance with current vehicle operation parameters. The autonomous vehicle control unit may control or operate the vehicle 100 to perform a defined operation or maneuver, such as parking the vehicle. The autonomous vehicle control unit may generate a route of travel from an origin, such as a current location of the vehicle 100, to a destination based on vehicle information, environment information, vehicle transportation network data representing the vehicle transportation network, or a combination thereof, and may control or operate the vehicle 100 to traverse the vehicle transportation network in accordance with the route. For example, the autonomous vehicle control unit may output the route of travel to the trajectory controller, and the trajectory controller may operate the vehicle 100 to travel from the origin to the destination using the generated route.

Figure 2:
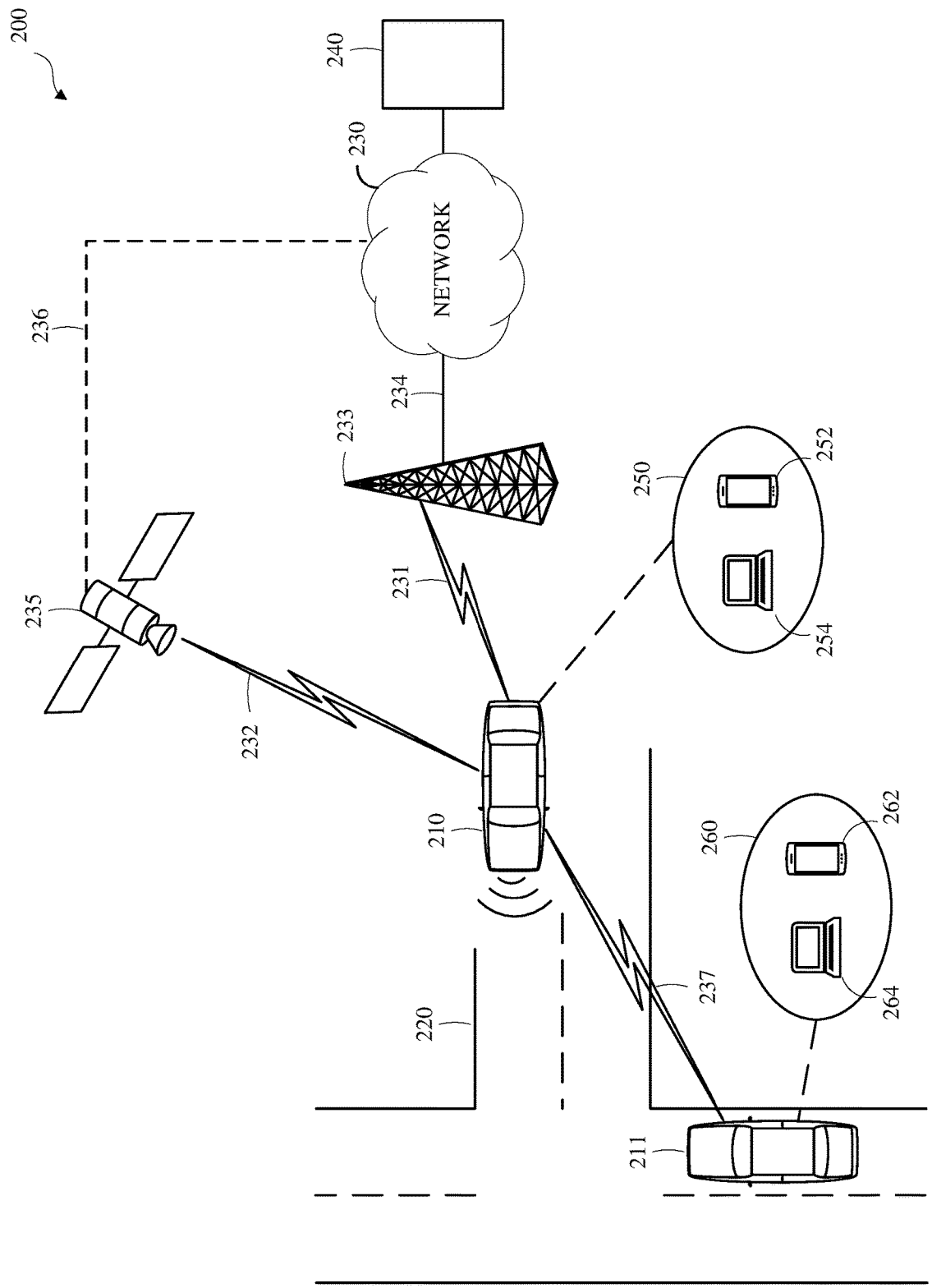
FIG. 2 is a diagram of an example of a portion of a vehicle transportation and communication system in which the aspects, features, and elements disclosed herein may be implemented.

FIG. 2 is a diagram of an example of a portion of a vehicle transportation and communication system in which the aspects, features, and elements disclosed herein may be implemented. The vehicle transportation and communication system 200 may include one or more vehicles 210/211, such as the vehicle 100 shown in FIG. 1, which may travel via one or more portions of one or more vehicle transportation networks 220, and may communicate via one or more electronic communication networks 230. Although not explicitly shown in FIG. 2, a vehicle may traverse an area that is not expressly or completely included in a vehicle transportation network, such as an off-road area.

The electronic communication network 230 may be, for example, a multiple access system and may provide for communication, such as voice communication, data communication, video communication, messaging communication, or a combination thereof, between the vehicle 210/211 and one or more communication devices 240. For example, a vehicle 210/211 may receive information, such as information representing the vehicle transportation network 220, from a communication device 240 via the network 230.

In some embodiments, a vehicle 210/211 may communicate via a wired communication link (not shown), a wireless communication link 231/232/237, or a combination of any number of wired or wireless communication links. For example, as shown, a vehicle 210/211 may communicate via a terrestrial wireless communication link 231, via a non-terrestrial wireless communication link 232, or via a combination thereof. The terrestrial wireless communication link 231 may include an Ethernet link, a serial link, a Bluetooth link, an infrared (IR) link, a UV link, or any link capable of providing for electronic communication.

A vehicle 210/211 may communicate with another vehicle 210/2110. For example, a host, or subject, vehicle (HV) 210 may receive one or more automated inter-vehicle messages, such as a basic safety message (BSM), from a remote, or target, vehicle (RV) 211, via a direct communication link 237, or via a network 230. For example, the remote vehicle 211 may broadcast the message to host vehicles within a defined broadcast range, such as 300 meters. In some embodiments, the host vehicle 210 may receive a message via a third party, such as a signal repeater (not shown) or another remote vehicle (not shown). A vehicle 210/211 may transmit one or more automated inter-vehicle messages periodically, based on, for example, a defined interval, such as 100 milliseconds.

Automated inter-vehicle messages may include vehicle identification information, geospatial state information, such as longitude, latitude, or elevation information, geospatial location accuracy information, kinematic state information, such as vehicle acceleration information, yaw rate information, speed information, vehicle heading information, braking system status information, throttle information, steering wheel angle information, or vehicle routing information, or vehicle operating state information, such as vehicle size information, headlight state information, turn signal information, wiper status information, transmission information, or any other information, or combination of information, relevant to the transmitting vehicle state. For example, transmission state information may indicate whether the transmission of the transmitting vehicle is in a neutral state, a parked state, a forward state, or a reverse state.

The vehicle 210 may communicate with the communications network 230 via an access point 233. The access point 233, which may include a computing device, may be configured to communicate with a vehicle 210, with a communication network 230, with one or more communication devices 240, or with a combination thereof via wired or wireless communication links 231/234. For example, the access point 233 may be a base station, a base transceiver station (BTS), a Node-B, an enhanced Node-B (eNode-B), a Home Node-B (HNode-B), a wireless router, a wired router, a hub, a relay, a switch, or any similar wired or wireless device. Although shown as a single unit in FIG. 2, an access point may include any number of interconnected elements.

The vehicle 210 may communicate with the communications network 230 via a satellite 235 or other non-terrestrial communication device. The satellite 235, which may include a computing device, may be configured to communicate with a vehicle 210, with a communication network 230, with one or more communication devices 240, or with a combination thereof via one or more communication links 232/236. Although shown as a single unit in FIG. 2, a satellite may include any number of interconnected elements.

An electronic communication network 230 may be any type of network configured to provide for voice, data, or any other type of electronic communication. For example, the electronic communication network 230 may include a local area network (LAN), a wide area network (WAN), a virtual private network (VPN), a mobile or cellular telephone network, the Internet, or any other electronic communication system. The electronic communication network 230 may use a communication protocol, such as the transmission control protocol (TCP), the user datagram protocol (UDP), the internet protocol (IP), the real-time transport protocol (RTP) the HyperText Transport Protocol (HTTP), or a combination thereof. Although shown as a single unit in FIG. 2, an electronic communication network may include any number of interconnected elements.

The vehicle 210 may identify a portion or condition of the vehicle transportation network 220. For example, the vehicle 210 may include one or more on-vehicle sensors, such as sensor 136 shown in FIG. 1, which may include a speed sensor, a wheel speed sensor, a camera, a gyroscope, an optical sensor, a laser sensor, a radar sensor, a sonic sensor, or any other sensor or device or combination thereof capable of determining or identifying a portion or condition of the vehicle transportation network 220. The sensor data may include lane line data, remote vehicle location data, or both.

The vehicle 210 may traverse a portion or portions of one or more vehicle transportation networks 220 using information communicated via the network 230, such as information representing the vehicle transportation network 220, information identified by one or more on-vehicle sensors, or a combination thereof.

Although for simplicity FIG. 2 shows two vehicles 210, 211, one vehicle transportation network 220, one electronic communication network 230, and one communication device 240, any number of vehicles, networks, or computing devices may be used. The vehicle transportation and communication system 200 may include devices, units, or elements not shown in FIG. 2. Although the vehicle 210 is shown as a single unit, a vehicle may include any number of interconnected elements.

Although the vehicle 210 is shown communicating with the communication device 240 via the network 230, the vehicle 210 may communicate with the communication device 240 via any number of direct or indirect communication links. For example, the vehicle 210 may communicate with the communication device 240 via a direct communication link, such as a Bluetooth communication link.

In some embodiments, a vehicle 210/211 may be associated with an entity 250/260, such as a driver, operator, or owner of the vehicle. In some embodiments, an entity 250/260 associated with a vehicle 210/211 may be associated with one or more personal electronic devices 252/254/262/264, such as a smartphone 252/262 or a computer 254/264. In some embodiments, a personal electronic device 252/254/262/264 may communicate with a corresponding vehicle 210/211 via a direct or indirect communication link. Although one entity 250/260 is shown as associated with a respective vehicle 210/211 in FIG. 2, any number of vehicles may be associated with an entity and any number of entities may be associated with a vehicle.

The vehicle transportation network 220 shows only navigable areas (e.g., roads), but the vehicle transportation network may also include one or more unnavigable areas, such as a building, one or more partially navigable areas, such as a parking area or pedestrian walkway, or a combination thereof. The vehicle transportation network 220 may also include one or more interchanges between one or more navigable, or partially navigable, areas. A portion of the vehicle transportation network 220, such as a road, may include one or more lanes and may be associated with one or more directions of travel.

A vehicle transportation network, or a portion thereof, may be represented as vehicle transportation network data. For example, vehicle transportation network data may be expressed as a hierarchy of elements, such as markup language elements, which may be stored in a database or file. For simplicity, the figures herein depict vehicle transportation network data representing portions of a vehicle transportation network as diagrams or maps; however, vehicle transportation network data may be expressed in any computer-usable form capable of representing a vehicle transportation network, or a portion thereof. The vehicle transportation network data may include vehicle transportation network control information, such as direction of travel information, speed limit information, toll information, grade information, such as inclination or angle information, surface material information, aesthetic information, defined hazard information, or a combination thereof.

A portion, or a combination of portions, of the vehicle transportation network 220 may be identified as a point of interest or a destination. For example, the vehicle transportation network data may identify a building as a point of interest or destination. The point of interest or destination may be identified using a discrete uniquely identifiable geolocation. For example, the vehicle transportation network 220 may include a defined location, such as a street address, a postal address, a vehicle transportation network address, a GPS address, or a combination thereof for the destination.

Figure 3:
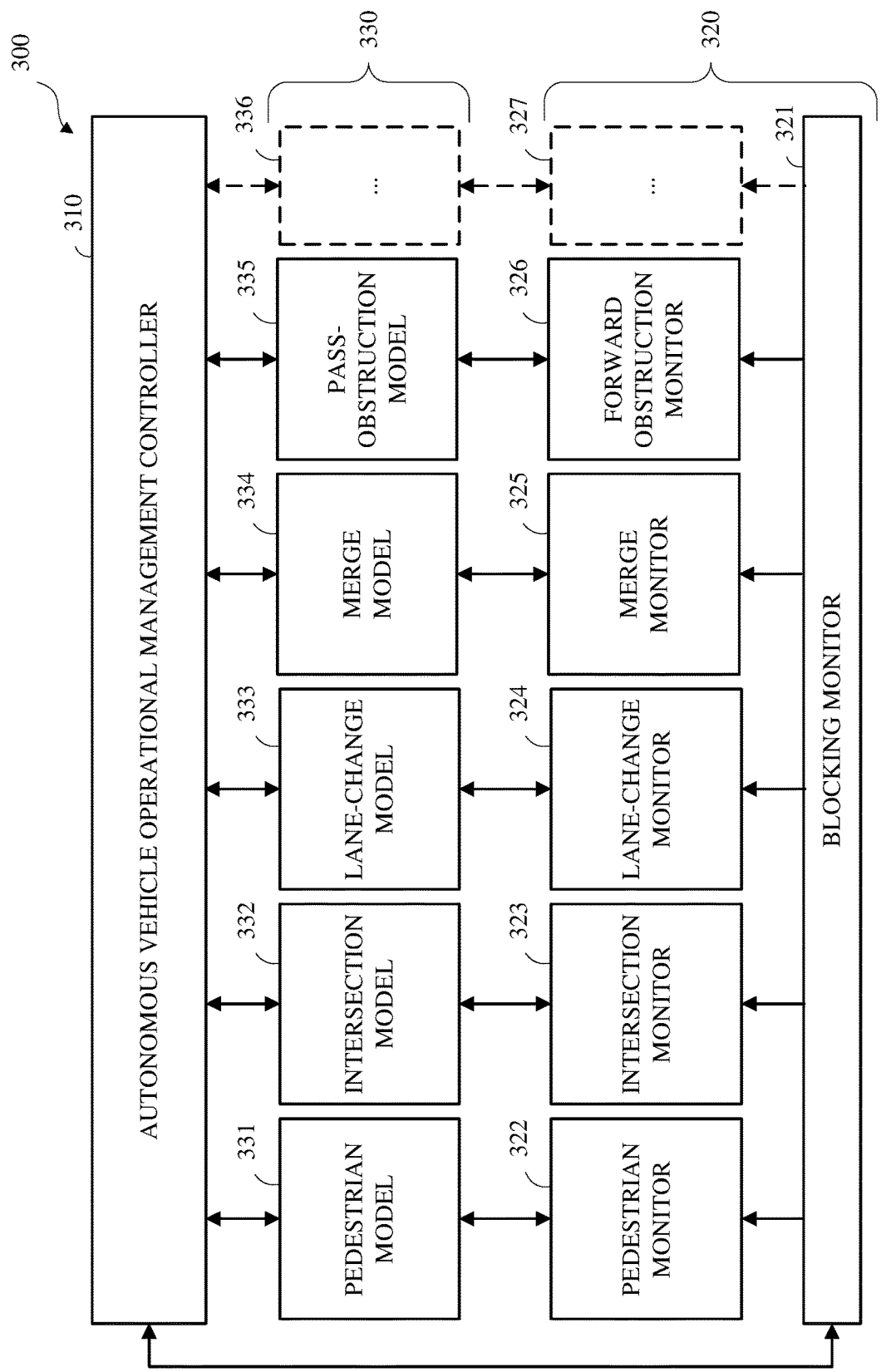
FIG. 3 is a diagram of an example of an autonomous vehicle operational management system in accordance with embodiments of this disclosure.

FIG. 3 is a diagram of an example of an autonomous vehicle operational management system 300 in accordance with embodiments of this disclosure. The autonomous vehicle operational management system 300 may be implemented in an autonomous vehicle, such as the vehicle 100 shown in FIG. 1, one of the vehicles 210/211 shown in FIG. 2, a semi-autonomous vehicle, or any other vehicle implementing autonomous decision-making, at least in part.

The autonomous vehicle may traverse a vehicle transportation network, or a portion thereof, which may include traversing distinct vehicle operation scenarios. A distinct vehicle operation scenario may include any distinctly identifiable set of operative conditions that may affect the operation of the autonomous vehicle within a defined spatiotemporal area, or operational environment, of the autonomous vehicle. For example, a distinct vehicle operation scenario may be based on a number or cardinality of roads, road segments, or lanes that the autonomous vehicle may traverse within a defined spatiotemporal distance. In another example, a distinct vehicle operation scenario may be based on one or more traffic control devices that may affect the operation of the autonomous vehicle within a defined spatiotemporal area, or operational environment, of the autonomous vehicle. In another example, a distinct vehicle operation scenario may be based on one or more identifiable rules, regulations, or laws that may affect the operation of the autonomous vehicle within a defined spatiotemporal area, or operational environment, of the autonomous vehicle. In another example, a distinct vehicle operation scenario may be based on one or more identifiable external objects that may affect the operation of the autonomous vehicle within a defined spatiotemporal area, or operational environment, of the autonomous vehicle.

As shown in FIG. 3, the autonomous vehicle operational management system 300 includes an autonomous vehicle operational management controller (AVOMC) 310, operational environment monitors 320, and operation control evaluation modules (also referred to as models) 330.

The AVOMC 310 may control the vehicle to traverse the vehicle transportation network, or a portion thereof. Controlling the vehicle to traverse the vehicle transportation network may include, in some implementations, monitoring the operational environment of the vehicle, identifying or detecting distinct vehicle operation scenarios, identifying candidate vehicle control actions based on the distinct vehicle operation scenarios, and controlling the vehicle to traverse a portion of the vehicle transportation network in accordance with one or more of the candidate vehicle control actions.

The AVOMC 310 may receive, identify, or otherwise access, operational environment data representing an operational environment for the autonomous vehicle, such as a current operational environment or an expected operational environment, or one or more aspects thereof. The operational environment of the autonomous vehicle may include a distinctly identifiable set of operative conditions that may affect the operation of the autonomous vehicle within a defined spatiotemporal area of the autonomous vehicle, within a defined spatiotemporal area of an identified route for the autonomous vehicle, or a combination thereof. For example, operative conditions that may affect the operation of the autonomous vehicle may be identified based on sensor data, vehicle transportation network data, route data, or any other data or combination of data representing a defined or determined operational environment for the vehicle.

The operational environment data may include vehicle information for the autonomous vehicle, such as information indicating a geospatial location of the autonomous vehicle, information correlating the geospatial location of the autonomous vehicle to information representing the vehicle transportation network, a route of the autonomous vehicle, a speed of the autonomous vehicle, an acceleration state of the autonomous vehicle, passenger information of the autonomous vehicle, or any other information about the autonomous vehicle or the operation of the autonomous vehicle. The operational environment data may include information representing the vehicle transportation network proximate to the autonomous vehicle, an identified route for the autonomous vehicle, or both. For example, this may include information within a defined spatial distance, such as 300 meters, of portions of the vehicle transportation network along the identified route, information indicating the geometry of one or more aspects of the vehicle transportation network, information indicating a condition, such as a surface condition, of the vehicle transportation network, or any combination thereof.

The operational environment data may include information representing external objects within the operational environment of the autonomous vehicle, such as information representing pedestrians, non-human animals, non-motorized transportation devices, such as bicycles or skateboards, motorized transportation devices, such as remote vehicles, or any other external object or entity that may affect the operation of the autonomous vehicle.

Aspects of the operational environment of the autonomous vehicle may be represented within respective distinct vehicle operation scenarios. For example, the relative orientation, trajectory, expected path, of external objects may be represented within respective distinct vehicle operation scenarios. In another example, the relative geometry of the vehicle transportation network may be represented within respective distinct vehicle operation scenarios.

The autonomous vehicle may traverse multiple distinct vehicle operation scenarios within an operational environment, which may be aspects of a compound vehicle operational scenario. For example, a pedestrian may approach the expected path for the autonomous vehicle traversing an intersection.

The autonomous vehicle operational management system 300 may operate or control the autonomous vehicle to traverse the distinct vehicle operation scenarios subject to defined constraints, such as safety constraints, legal constraints, physical constraints, user acceptability constraints, or any other constraint or combination of constraints that may be defined or derived for the operation of the autonomous vehicle.

The AVOMC 310 may monitor the operational environment of the autonomous vehicle, or defined aspects thereof. Monitoring the operational environment of the autonomous vehicle may include identifying and tracking external objects, identifying distinct vehicle operation scenarios, or a combination thereof. For example, the AVOMC 310 may identify and track external objects within the operational environment of the autonomous vehicle. Identifying and tracking the external objects may include identifying spatiotemporal locations of respective external objects, which may be relative to the autonomous vehicle, identifying one or more expected paths for respective external objects, which may include identifying a speed, a trajectory, or both, for an external object. For simplicity and clarity, descriptions of locations, expected locations, paths, expected paths, and the like herein may omit express indications that the corresponding locations and paths refer to geospatial and temporal components; however, unless expressly indicated herein, or otherwise unambiguously clear from context, the locations, expected locations, paths, expected paths, and the like described herein may include geospatial components, temporal components, or both. Monitoring the operational environment of the autonomous vehicle may include using operational environment data received by the operational environment monitors 320.

The operational environment monitors 320 may include scenario-agnostic monitors, scenario-specific monitors, or a combination thereof. A scenario-agnostic monitor, such as a blocking monitor 321, may monitor the operational environment of the autonomous vehicle, generate operational environment information representing aspects of the operational environment of the autonomous vehicle, and output the operational environment information to one or more scenario-specific monitors, the AVOMC 310, or a combination thereof, as discussed in further detail below. A scenario-specific monitor, such as a pedestrian monitor 322, an intersection monitor 323, a lane-change monitor 324, a merge monitor 325, or a forward obstruction monitor 326, may monitor the operational environment of the autonomous vehicle, generate operational environment information representing scenario-specific aspects of the operational environment of the autonomous vehicle, and output the operational environment information to one or more operation control evaluation models 330, the AVOMC 310, or a combination thereof.

For example, the pedestrian monitor 322 may be an operational environment monitor for monitoring pedestrians, the intersection monitor 323 may be an operational environment monitor for monitoring intersections, the lane-change monitor 324 may be an operational environment monitor for monitoring lane-changes, the merge monitor 325 may be an operational environment monitor for merges, and the forward obstruction monitor 326 may be an operational environment monitor for monitoring forward obstructions. An operational environment monitor 327 is shown using broken lines to indicate that the autonomous vehicle operational management system 300 may include any number of operational environment monitors 320.

An operational environment monitor 320 may receive, or otherwise access, operational environment data, such as operational environment data generated or captured by one or more sensors of the autonomous vehicle, vehicle transportation network data, vehicle transportation network geometry data, route data, or a combination thereof. For example, the pedestrian monitor 322 may receive, or otherwise access, information, such as sensor data, which may indicate, correspond to, or may otherwise be associated with, one or more pedestrians in the operational environment of the autonomous vehicle. An operational environment monitor 320 may associate the operational environment data, or a portion thereof, with the operational environment, or an aspect thereof, such as with an external object, such as a pedestrian, a remote vehicle, or an aspect of the vehicle transportation network geometry.

An operational environment monitor 320 may generate, or otherwise identify, information representing one or more aspects of the operational environment, such as with an external object, such as a pedestrian, a remote vehicle, or an aspect of the vehicle transportation network geometry, which may include filtering, abstracting, or otherwise processing the operational environment data. An operational environment monitor 320 may output the information representing the one or more aspects of the operational environment to, or for access by, the AVOMC 310, such by storing the information representing the one or more aspects of the operational environment in a memory, such as the memory 134 shown in FIG. 1, of the autonomous vehicle accessible by the AVOMC 310, sending the information representing the one or more aspects of the operational environment to the AVOMC 310, or a combination thereof. An operational environment monitor 320 may output the operational environment information to one or more elements of the autonomous vehicle operational management system 300, such as the AVOMC 310. Although not shown in FIG. 3, a scenario-specific operational environment monitor 322, 323, 324, 325, 326 may output operational environment data or the derived operational environment information to a scenario-agnostic operational environment monitor, such as the blocking monitor 321.

The pedestrian monitor 322 may correlate, associate, or otherwise process the operational environment data to identify, track, or predict actions of one or more pedestrians. For example, the pedestrian monitor 322 may receive information, such as sensor data, from one or more sensors, which may correspond to one or more pedestrians, the pedestrian monitor 322 may associate the sensor data with one or more identified pedestrians, which may include may identifying a direction of travel, a path, such as an expected path, a current or expected velocity, a current or expected acceleration rate, or a combination thereof for one or more of the respective identified pedestrians, and the pedestrian monitor 322 may output the identified, associated, or generated pedestrian information to, or for access by, the AVOMC 310.

The intersection monitor 323 may correlate, associate, or otherwise process the operational environment data to identify, track, or predict actions of one or more remote vehicles in the operational environment of the autonomous vehicle, to identify an intersection, or an aspect thereof, in the operational environment of the autonomous vehicle, to identify vehicle transportation network geometry, or a combination thereof. For example, the intersection monitor 323 may receive information, such as sensor data, from one or more sensors, which may correspond to one or more remote vehicles in the operational environment of the autonomous vehicle, the intersection, or one or more aspects thereof, in the operational environment of the autonomous vehicle, the vehicle transportation network geometry, or a combination thereof, the intersection monitor 323 may associate the sensor data with one or more identified remote vehicles in the operational environment of the autonomous vehicle, the intersection, or one or more aspects thereof, in the operational environment of the autonomous vehicle, the vehicle transportation network geometry, or a combination thereof, which may include may identifying a current or expected direction of travel, a path, such as an expected path, a current or expected velocity, a current or expected acceleration rate, or a combination thereof for one or more of the respective identified remote vehicles. The intersection monitor 323 may output the identified, associated, or generated intersection information to, or for access by, the AVOMC 310.

The lane-change monitor 324 may correlate, associate, or otherwise process the operational environment data to identify, track, or predict actions of one or more remote vehicles in the operational environment of the autonomous vehicle, such as information indicating a slow or stationary remote vehicle along the expected path of the autonomous vehicle, to identify one or more aspects of the operational environment of the autonomous vehicle, such as vehicle transportation network geometry in the operational environment of the autonomous vehicle, or a combination thereof geospatially corresponding to a lane-change operation. For example, the lane-change monitor 324 may receive information, such as sensor data, from one or more sensors, which may correspond to one or more remote vehicles in the operational environment of the autonomous vehicle, one or more aspects of the operational environment of the autonomous vehicle in the operational environment of the autonomous vehicle or a combination thereof geospatially corresponding to a lane-change operation, the lane-change monitor 324 may associate the sensor data with one or more identified remote vehicles in the operational environment of the autonomous vehicle, one or more aspects of the operational environment of the autonomous vehicle or a combination thereof geospatially corresponding to a lane-change operation, which may include may identifying a current or expected direction of travel, a path, such as an expected path, a current or expected velocity, a current or expected acceleration rate, or a combination thereof for one or more of the respective identified remote vehicles. The lane-change monitor 324 may output the identified, associated, or generated lane-change information to, or for access by, the AVOMC 310

The merge monitor 325 may correlate, associate, or otherwise process the operational environment information to identify, track, or predict actions of one or more remote vehicles in the operational environment of the autonomous vehicle, to identify one or more aspects of the operational environment of the autonomous vehicle, such as vehicle transportation network geometry in the operational environment of the autonomous vehicle, or a combination thereof geospatially corresponding to a merge operation. For example, the merge monitor 325 may receive information, such as sensor data, from one or more sensors, which may correspond to one or more remote vehicles in the operational environment of the autonomous vehicle, one or more aspects of the operational environment of the autonomous vehicle in the operational environment of the autonomous vehicle or a combination thereof geospatially corresponding to a merge operation, the merge monitor 325 may associate the sensor data with one or more identified remote vehicles in the operational environment of the autonomous vehicle, one or more aspects of the operational environment of the autonomous vehicle or a combination thereof geospatially corresponding to a merge operation, which may include identifying a current or expected direction of travel, a path, such as an expected path, a current or expected velocity, a current or expected acceleration rate, or a combination thereof for one or more of the respective identified remote vehicles. The merge monitor 325 may output the identified, associated, or generated merge information to, or for access by, the AVOMC 310.

The forward obstruction monitor 326 may correlate, associate, or otherwise process the operational environment information to identify one or more aspects of the operational environment of the autonomous vehicle geospatially corresponding to a forward pass-obstruction operation. For example, the forward obstruction monitor 326 may identify vehicle transportation network geometry in the operational environment of the autonomous vehicle. The forward obstruction monitor 326 may identify one or more obstructions or obstacles in the operational environment of the autonomous vehicle, such as a slow or stationary remote vehicle along the expected path of the autonomous vehicle or along an identified route for the autonomous vehicle; and the forward obstruction monitor 326 may identify, track, or predict actions of one or more remote vehicles in the operational environment of the autonomous vehicle. The forward obstruction monitor 326 may receive information, such as sensor data, from one or more sensors, which may correspond to one or more remote vehicles in the operational environment of the autonomous vehicle, one or more aspects of the operational environment of the autonomous vehicle in the operational environment of the autonomous vehicle or a combination thereof geospatially corresponding to a forward pass-obstruction operation. The forward obstruction monitor 326 may associate the sensor data with one or more identified remote vehicles in the operational environment of the autonomous vehicle, one or more aspects of the operational environment of the autonomous vehicle or a combination thereof geospatially corresponding to the forward pass-obstruction operation, which may include may identifying a current or expected direction of travel, a path, such as an expected path, a current or expected velocity, a current or expected acceleration rate, or a combination thereof for one or more of the respective identified remote vehicles. The forward obstruction monitor 326 may output the identified, associated, or generated forward obstruction information to, or for access by, the AVOMC 310.

While shown as an operation environment monitor 320, the blocking monitor 321 may be a separate monitoring device. The blocking monitor 321 may receive operational environment data representing an operational environment, or an aspect thereof, for the vehicle. For example, the blocking monitor 321 may receive the operational environment data from the AVOMC 310, from a sensor of the vehicle, from an external device, such as a remote vehicle or an infrastructure device, or a combination thereof. The blocking monitor 321 may read the operational environment data, or a portion thereof, from a memory, such as a memory of the autonomous vehicle, such as the memory 134 shown in FIG. 1.

The blocking monitor 321, using this input, may determine a respective probability of availability (POA), or corresponding blocking probability, for one or more portions of the vehicle transportation network, such as portions of the vehicle transportation network proximal to the autonomous vehicle, which may include portions of the vehicle transportation network corresponding to an expected path of the autonomous vehicle, such as an expected path identified based on a current route of the autonomous vehicle. A probability of availability, or corresponding blocking probability, may indicate a probability or likelihood that the autonomous vehicle may traverse a portion of, or spatial location within, the vehicle transportation network safely, such as unimpeded by an external object, such as a remote vehicle or a pedestrian. For example, a portion of the vehicle transportation network may include an obstruction, such as a stationary object, and a probability of availability for the portion of the vehicle transportation network may be low, such as 0%, which may be expressed as a high blocking probability, such as 100%, for the portion of the vehicle transportation network. The blocking monitor 321 may identify a respective probability of availability for each of multiple portions of the vehicle transportation network within an operational environment, such as within 300 meters, of the autonomous vehicle. The blocking monitor 321 may determine, or update, probabilities of availability continually or periodically. The blocking monitor 321 may communicate probabilities of availability, or corresponding blocking probabilities, to the AVOMC 310.

A probability of availability may be indicated by the blocking monitor 321 corresponding to each external object in the operational environment of the autonomous vehicle and a geospatial area may be associated with multiple probabilities of availability corresponding to multiple external objects. An aggregate probability of availability may be indicated by the blocking monitor 321 corresponding to each type of external object in the operational environment of the autonomous vehicle, such as a probability of availability for pedestrians and a probability of availability for remote vehicles, and a geo spatial area may be associated with multiple probabilities of availability corresponding to multiple external object types.

The blocking monitor 321 may identify external objects, track external objects, project location information, path information, or both for external objects, or a combination thereof. For example, the blocking monitor 321 may identify an external object and identify an expected path for the external object based on operational environment information (e.g., a current location of the external object), information indicating a current trajectory and/or speed for the external object, information indicating a type of classification of the external object (e.g., a pedestrian or a remote vehicle), vehicle transportation network information (e.g., a crosswalk proximate to the external object), previously identified or tracked information associated with the external object, or any combination thereof. The expected path may indicate a sequence of expected spatial locations, expected temporal locations, and corresponding probabilities.

The blocking monitor 321 may communicate probabilities of availability, or corresponding blocking probabilities, to the AVOMC 310. The AVOMC 310 may communicate the probabilities of availability, or corresponding blocking probabilities, to respective instantiated instances of the operation control evaluation models 330.

The AVOMC 310 may identify one or more distinct vehicle operation scenarios based on one or more aspects of the operational environment represented by the operational environment information. For example, the AVOMC 310 may identify a distinct vehicle operation scenario in response to identifying, or based on, the operational environment information indicated by one or more of the operational environment monitors 320. The distinct vehicle operation scenario may be identified based on route data, sensor data, or a combination thereof. For example, the AVOMC 310 may identify one or multiple distinct vehicle operation scenarios corresponding to an identified route for the vehicle, such as based on map data corresponding to the identified route, in response to identifying the route. Multiple distinct vehicle operation scenarios may be identified based on one or more aspects of the operational environment represented by the operational environment information. For example, the operational environment information may include information representing a pedestrian approaching an intersection along an expected path for the autonomous vehicle, and the AVOMC 310 may identify a pedestrian vehicle operational scenario, an intersection vehicle operational scenario, or both.

The AVOMC 310 may instantiate respective instances of one or more of the operation control evaluation models 330 based on one or more aspects of the operational environment represented by the operational environment information, such as the identification of an upcoming scenario. An upcoming scenario may be a distinct vehicle operation scenario that the AVOMC 310 determines that the autonomous vehicle is likely to encounter if it continues in its path. Upcoming scenarios may be expected (e.g., can be determined from the route of the autonomous vehicle) or unexpected. An unexpected upcoming scenario may be a scenario that can be detected by the sensors of the vehicle and cannot be determined without sensor data.

The operation control evaluation models 330 may include scenario-specific operation control evaluation model (SSOCEMs), such as a pedestrian-SSOCEM 331, an intersection-SSOCEM 332, a lane-change-SSOCEM 333, a merge-SSOCEM 334, a pass-obstruction-SSOCEM 335, or a combination thereof. A SSOCEM 336 is shown using broken lines to indicate that the autonomous vehicle operational management system 300 may include any number of SSOCEMs 330. For example, the AVOMC 310 may instantiate an instance of a SSOCEM 330 in response to identifying a distinct vehicle operation scenario. The AVOMC 310 may instantiate multiple instances of one or more SSOCEMs 330 based on one or more aspects of the operational environment represented by the operational environment data. For example, the operational environment data may indicate two pedestrians in the operational environment of the autonomous vehicle and the AVOMC 310 may instantiate a respective instance of the pedestrian-SSOCEM 331 for each pedestrian.

The AVOMC 310 may send the operational environment information, or one or more aspects thereof, to another unit of the autonomous vehicle, such as the blocking monitor 321 or one or more instances of the SSOCEMs 330. For example, the AVOMC 310 may communicate the probabilities of availability, or corresponding blocking probabilities, received from the blocking monitor 321 to respective instantiated instances of the SSOCEMs 330. The AVOMC 310 may store the operational environment information, or one or more aspects thereof, such as in a memory, such as the memory 134 shown in FIG. 1, of the autonomous vehicle.

Although not expressly shown in FIG. 3, the autonomous vehicle operational management system 300 may include a predictor module that may generate and send prediction information to the blocking monitor 321, and the blocking monitor 321 may output probability of availability information to one or more of the other operational environment monitors 320.

A SSOCEM 330, once instantiated, can receive the operational environment information, which may include sensor data, to determine and output a candidate vehicle control action, also called a candidate action herein. A candidate action is a vehicle control action that is identified by the particular SSOCEM 330 as the likely optimal action for the vehicle to perform that will handle a particular scenario. For instance, a SSOCEM 330 configured to handle intersections (e.g., an intersection SSOCEM 332) may output a "proceed", a candidate action that suggests proceeding through an intersection. At the same time, a SSOCEM 330 for handling lane changes (e.g., the lane change SSOCEM 333) may output a "turn left" candidate action indicating that the vehicle should merge left by two degrees. In some implementations, each SSOCEM 330 outputs a confidence score indicating a degree of confidence in the candidate action determined by the SSOCEM 330. For instance, a confidence score greater than 0.95 may indicate a very high confidence in the candidate action, while a confidence score less than 0.5 may indicate a relatively low degree of confidence in the candidate action. Further details of a SSOCEM 330 are described below.

The AVOMC 310 may receive one or more candidate actions from respective instances of the SSOCEMs 330. The AVOMC 310 may identify a vehicle control action from the candidate vehicle control actions, and may control the vehicle, or may provide the identified vehicle control action to another vehicle control unit, to traverse the vehicle transportation network in accordance with the vehicle control action.

A vehicle control action may indicate a vehicle control operation or maneuver, such as accelerating, decelerating, turning, stopping, or any other vehicle operation or combination of vehicle operations that may be performed by the autonomous vehicle in conjunction with traversing a portion of the vehicle transportation network. For example, an 'advance' vehicle control action may include slowly inching forward a short distance, such as a few inches or a foot; an 'accelerate' vehicle control action may include accelerating a defined acceleration rate, or at an acceleration rate within a defined range; a 'decelerate' vehicle control action may include decelerating a defined deceleration rate, or at a deceleration rate within a defined range; a 'maintain' vehicle control action may include maintaining current operational parameters, such as by maintaining a current velocity, a current path or route, or a current lane orientation; and a 'proceed' vehicle control action may include beginning or resuming a previously identified set of operational parameters. Although some vehicle control actions are described herein, other vehicle control actions may be used.

A vehicle control action may include one or more performance metrics. For example, a 'stop' vehicle control action may include a deceleration rate as a performance metric. In another example, a 'proceed' vehicle control action may expressly indicate route or path information, speed information, an acceleration rate, or a combination thereof as performance metrics, or may expressly or implicitly indicate that a current or previously identified path, speed, acceleration rate, or a combination thereof may be maintained.

A vehicle control action may be a compound vehicle control action, which may include a sequence, combination, or both of vehicle control actions. For example, an 'advance' vehicle control action may indicate a 'stop' vehicle control action, a subsequent 'accelerate' vehicle control action associated with a defined acceleration rate, and a subsequent 'stop' vehicle control action associated with a defined deceleration rate, such that controlling the autonomous vehicle in accordance with the 'advance' vehicle control action includes controlling the autonomous vehicle to slowly inch forward a short distance, such as a few inches or a foot.

In some implementations, the AVOMC 310 utilizes hard-coded logic to determine the vehicle control action from the candidate actions. For example, the AVOMC 310 may select the candidate action having the highest confidence score. In other implementations, the AVOMC 310 may select the candidate action that is the least likely to result in a collision. In other implementations, the AVOMC 310 may generate a compound action based on two or more non-conflicting candidate actions (e.g., compounding 'proceed' and 'turn left by two degrees' to result in a vehicle control action that causes the vehicle to veer left and proceed through an intersection). In some implementations, the AVOMC 310 may utilize a machine learning algorithm to determine a vehicle control action based on two or more differing candidate actions.

For example, identifying the vehicle control action from the candidate actions may include implementing a machine learning component, such as supervised learning of a classification problem, and training the machine learning component using examples, such as 1000 examples, of the corresponding vehicle operational scenario. In another example, identifying the vehicle control action from the candidate actions may include implementing a Markov Decision Process (MDP), or a Partially Observable Markov Decision Process (POMDP), which may describe how respective candidate actions affect subsequent candidate actions, and may include a reward function that outputs a positive or negative reward for respective vehicle control actions.

The AVOMC 310 may uninstantiate an instance of a SSOCEM 330. For example, the AVOMC 310 may identify a distinct set of operative conditions as indicating a distinct vehicle operation scenario for the autonomous vehicle, instantiate an instance of a SSOCEM 330 for the distinct vehicle operation scenario, monitor the operative conditions, subsequently determine that one or more of the operative conditions has expired, or has a probability of affecting the operation of the autonomous vehicle below a defined threshold, and the AVOMC 310 may uninstantiate the instance of the SSOCEM 330.

As referred to briefly above, a SSOCEM 330 may model a respective distinct vehicle operation scenario. The autonomous vehicle operational management system 300 includes any number of SSOCEMs 330, each modeling a respective distinct vehicle operation scenario. Modeling a distinct vehicle operation scenario may include generating and/or maintaining state information representing aspects of an operational environment of the vehicle corresponding to the distinct vehicle operation scenario, identifying potential interactions among the modeled aspects respective of the corresponding states, and determining a candidate action that solves the model. Stated more simply, a SSOCEM 330 may include one or more models that are configured to determine one or more vehicle control actions for handling a scenario given a set of inputs. The models may include, but are not limited to, POMDP models, MDP models, Classical Planning (CP) models, Partially Observable Stochastic Game (POSG) models, Decentralized Partially Observable Markov Decision Process (Dec-POMDP) models, Reinforcement Learning (RL) models, artificial neural networks, hardcoded expert logic, or any other suitable types of models. Examples of different types of models are provided below. Each SSOCEM 330 includes computer-executable instructions that define a manner by which the models, e.g., decision process models, operate and a manner by which the models are utilized.

A SSOCEM 330 may implement a discrete time stochastic control process, such as a POMDP model, which may be a single-agent model that models a distinct vehicle operation scenario, which may include modeling uncertainty, using a set of states (S), a set of actions (A), a set of observations ($\Omega$), a set of state transition probabilities (T), a set of conditional observation probabilities (O), a reward function (R), or a combination thereof. A POMDP model may be defined or described as a tuple <S, A, $\Omega$, T, O, R>.

A state from the set of states (S), may represent a distinct condition of respective defined aspects, such as external objects and traffic control devices, of the operational environment of the autonomous vehicle that may probabilistically affect the operation of the autonomous vehicle at a discrete temporal location. A respective set of states (S) may be defined for each distinct vehicle operation scenario. Each state (state space) from a set of states (S) may include one or more defined state factors. Although some examples of state factors for some models are described herein, a model, including any model described herein, may include any number, or cardinality, of state factors. Each state factor may represent a defined aspect of the respective scenario and may have a respective defined set of values. Although some examples of state factor values for some state factors are described herein, a state factor, including any state factor described herein, may include any number, or cardinality, of values.

For example, a remote or external object operating in the proximity of the vehicle may affect the operation of the vehicle and may be represented in a model. The model may include representing the following identified or expected information for the remote object, such as a remote vehicle: its geospatial location, its path, heading, or both, its velocity, its acceleration or deceleration rate, or a combination thereof corresponding to a respective temporal location. A respective set of states may be defined for each distinct vehicle operation scenario. At instantiation, the current state of the model may correspond to a contemporaneous state or condition of the operating environment.

An action from the set of actions (A) may indicate an available vehicle control action at each state in the set of states (S). A respective set of actions may be defined for each distinct vehicle operation scenario. Each action (action space) from a set of actions (A) may include one or more defined action factors. Although some examples of action factors for some models are described herein, a model, including any model described herein, may include any number, or cardinality, of action factors. Each action factor may represent an available vehicle control action and may have a respective defined set of values. Although some examples of action factor values for some action factors are described herein, an action factor, including any action factor described herein, may include any number, or cardinality, of values.

An observation from the set of observations ($\Omega$) may indicate available observable, measurable, or determinable data for each state from the set of states (S). A respective set of observations may be defined for each distinct vehicle operation scenario. Each observation (observation space), from a set of observations ($\Omega$) may include one or more defined observation factors. Although some examples of observation factors for some models are described herein, a model, including any model described herein, may include any number, or cardinality, of observation factors. Each observation factor may represent available observations and may have a respective defined set of values. Although some examples of observation factor values for some observation factors are described herein, an observation factor, including any observation factor described herein, may include any number, or cardinality, of values.

A state transition probability from the set of state transition probabilities (T) may probabilistically represent changes to the operational environment of the autonomous vehicle, as represented by the set of states (S), responsive to the actions of the autonomous vehicle, as represented by the set of actions (A), which may be expressed as T: S×A×S→ [0, 1]. A respective set of state transition probabilities (T) may be defined for each distinct vehicle operation scenario. Although some examples of state transition probabilities for some models are described herein, a model, including any model described herein, may include any number, or cardinality, of state transition probabilities. For example, each combination of a state, an action, and a subsequent state may be associated with a respective state transition probability.

The set of state transition probabilities may be identified based on the operational environment data. For example, the operational environment data may indicate an area type, such as urban or rural, a time of day, an ambient light level, weather conditions, traffic conditions, which may include expected traffic conditions, such as rush hour conditions, event-related traffic congestion, or holiday related driver behavior conditions, road conditions, jurisdictional conditions, such as country, state, or municipality conditions, or any other condition or combination of conditions that may affect the operation of the vehicle.

Examples of state transition probabilities associated with a pedestrian vehicle operational scenario may include a defined probability of a pedestrian jaywalking (e.g., based on a geospatial distance between the pedestrian and the respective road segment); a defined probability of a pedestrian stopping in an intersection; a defined probability of a pedestrian crossing at a crosswalk; a defined probability of a pedestrian yielding to the vehicle at a crosswalk; any other probability associated with a pedestrian vehicle operational scenario.

Examples of state transition probabilities associated with an intersection vehicle operational scenario may include a defined probability of a remote vehicle arriving at an intersection; a defined probability of a remote vehicle cutting-off the autonomous vehicle; a defined probability of a remote vehicle traversing an intersection immediately subsequent to, and in close proximity to, a second remote vehicle traversing the intersection, such as in the absence of a right-of-way (piggybacking); a defined probability of a remote vehicle stopping, adjacent to the intersection, in accordance with a traffic control device, regulation, or other indication of right-of-way, prior to traversing the intersection; a defined probability of a remote vehicle traversing the intersection; a defined probability of a remote vehicle diverging from an expected path proximal to the intersection; a defined probability of a remote vehicle diverging from an expected right-of-way priority; or any other probability associated with an intersection vehicle operational scenario.

Examples of state transition probabilities associated with a lane change vehicle operational scenario may include a defined probability of a remote vehicle changing velocity, such as a defined probability of a remote vehicle behind the vehicle increasing velocity or a defined probability of a remote vehicle in front of the vehicle decreasing velocity; a defined probability of a remote vehicle in front of the vehicle changing lanes; a defined probability of a remote vehicle proximate to the vehicle changing speed to allow the vehicle to merge into a lane; or any other probabilities associated with a lane change vehicle operational scenario.

A conditional observation probability from the set of conditional observation probabilities (O) may represent probabilities of making respective observations (Ω) based on the operational environment of the vehicle, as represented by the set of states (S), responsive to the actions of the vehicle, as represented by the set of actions (A), which may be represented as O: A×S×Ω→[0, 1]. A respective set of conditional observation probabilities (O) may be defined for each distinct vehicle operation scenario. Although some examples of state conditional observation probabilities for some models are described herein, a model, including any model described herein, may include any number, or cardinality, of conditional observation probabilities. For example, each combination of an action, a subsequent state, and an observation may be associated with a respective conditional observation probability.

An example may be illustrated with reference to an intersection that the vehicle is approaching by traversing a first road. Contemporaneously, a remote vehicle may approach the intersection by traversing a second road. The vehicle may identify and evaluate operational environment data, such as sensor data, corresponding to the intersection, which may include operational environment data corresponding to the remote vehicle. The operational environment data may be inaccurate, incomplete, or erroneous. The vehicle may identify information probabilistically identifying the remote vehicle, such as probabilistically identifying location information for the remote vehicle. The conditional observation probability corresponding to observing, or probabilistically identifying, the location of the remote vehicle represents the probability that the identified operational environment information accurately represents the location of the remote vehicle. A model, including any model described herein, may include any number, or cardinality, of conditional observation probabilities. For example, each combination of an action, a subsequent state, and an observation may be associated with a respective conditional observation probability.

The reward function (R) may determine a respective positive or negative (cost) value that may be accrued for each combination of state and action, which may represent an expected value of the autonomous vehicle traversing the vehicle transportation network from the corresponding state in accordance with the corresponding vehicle control action to the subsequent state, which may be expressed as R: S×A→$\mathbb{R}$.

Solving a model may include determining a policy or solution, which may be a function, that maximizes the accrued reward, which may be determined by evaluating the possible combinations of the elements of the tuple, such as <S, A, Ω, T, O, R>, that defines the model. A policy or solution may identify or output a reward maximized, or optimal, candidate vehicle control action based on identified belief state data. The identified belief state data, which may be probabilistic, may indicate current state data, such as a current set of state values for the respective model, or a probability for the current set of state values, and may correspond with a respective relative temporal location. For example, solving a MDP model may include identifying a state from the set of states, identifying an action from the set of actions, determining a subsequent, or successor, state from the set of states subsequent to simulating the action subject to the state transition probabilities. Each state may be associated with a corresponding utility value, and solving the MDP model may include determining respective utility values corresponding to each possible combination of state, action, and subsequent state. The utility value of the subsequent state may be identified as the maximum identified utility value subject to a reward or penalty, which may be a discounted reward or penalty. The policy may indicate an action corresponding to the maximum utility value for a respective state. Solving a POMDP model is similar to solving the MDP model, except based probabilities for respective states and subject to observation probabilities corresponding generating observations for respective states. Where a probability is associated with a state within a POMDP model and other models that do not rely on discrete states, the states may be referred to as belief states. Thus, solving the SSOCEM model may include evaluating the possible state-action-state transitions and updating respective belief states, such as using Bayes' rule, particle filters, etc., based on respective actions and observations.

The autonomous vehicle operational management system 300 may include any number or combination of types of models. For example, the pedestrian-SSOCEM 331, the intersection-SSOCEM 332, the lane-change-SSOCEM 333, the merge-SSOCEM 334, and the pass-obstruction-SSOCEM 335 may be POMDP models. In another example, the pedestrian-SSOCEM 331 may be an MDP model and the intersection-SSOCEM 332 may be a POMDP model. The AVOMC 310 may instantiate any number of instances of the SSOCEMs 330 based on the operational environment data. A SSOCEM 336 is shown using broken lines to indicate that the autonomous vehicle operational management system 300 may include any number or additional types of SSOCEMs 330. Although not expressly shown, in some embodiments an operational environment monitor 320 may identify occlusions, may identify or determine a probability that an external object is occluded, or hidden, by an identified occlusion, and may include occluded vehicle probability information in one or more SSOCEMs 330.

One or more of the AVOMC 310, the operational environment monitors 320, or the SSOCEMs 330 may operate continuously or periodically, such as at a frequency of ten hertz (10 Hz). For example, the AVOMC 310 may identify a vehicle control action many times, such as ten times, per second. The operational frequency of each component of the autonomous vehicle operational management system 300 may be synchronized or unsynchronized, and the operational rate of one or more of the AVOMC 310, the operational environment monitors 320, or the SSOCEMs 330 may be independent of the operational rate of others.

The SSOCEMs 330 correspond to the decision components initially referenced. That is, a SSOCEM 330 can recommend an action based on the belief state of the operational environment of the vehicle. Where a SSOCEM 330 explicitly maintains a belief state, the belief state is updated using the current belief state, an observation made (e.g., by an observation monitor or model, such as one or more of the operational environment monitors 320), and the action selected by the SSOCEM 330. While this technique is useful for the off-line development of policy that maps any belief state to an action, problems can arise in real-time decision-making of a SSOCEM 330 due to sensor noise or errors, an error in the model, or both.

One problem may be illustrated by referring to FIG. 2. The vehicle 210 monitors the conditions of the operational environment, such as an upcoming scenario within the vehicle transportation network 220. For example, the vehicle 210 is approaching an intersection. The AVOMC 310 of the vehicle 210 may instantiate an instance of an intersection model 332, and more specifically a T-intersection model. Assume that a current belief state is 0.8 that the remote vehicle 211 is approaching the intersection and 0.2 that the remote vehicle 211 is at the intersection. The intersection monitor 323, due to sensor noise, may produce or otherwise generate an observation (e.g., an observation $\Omega$) that the vehicle 211 is at a goal of the scenario (e.g., past the intersection). This observation is impossible given the belief state. Known techniques for updating the belief state, e.g., Bayes' rule, particle filters, Kalman filters, etc., fail where the observation is impossible given the (e.g., current) belief state. For example, the update may fail due to a division by 0. Thus, the intersection model 332 can fail to produce a candidate action.

Another problem may result from errors in the model, such as a SSOCEM 330. An error in the model, as observations are gained, may cause the model to update to any belief. More specifically, small errors such as an error in the probability of an observation and/or an error in how the operational environment transitions accumulate as the belief state is repeatedly updated. The belief state can drift in an incorrect direction (i.e., away from a belief state that reflects actual transportation network and the tracked object therein).

These problems may be addressed by modifying or replacing an operational environment monitor 320 as previously described such that the updated or new operational environment monitor determines or otherwise computes a belief state directly from raw perception of the operational environment (e.g., features sensed, determined, or otherwise perceived as the operational environment data described above). The operational environment monitor does so without relying on a belief update equation. The belief state is determined instead of or in addition to maintaining a belief state within a SSOCEM model. The belief state determination is particularly desirable for real-time decision-making of the vehicle.

Figure 4:
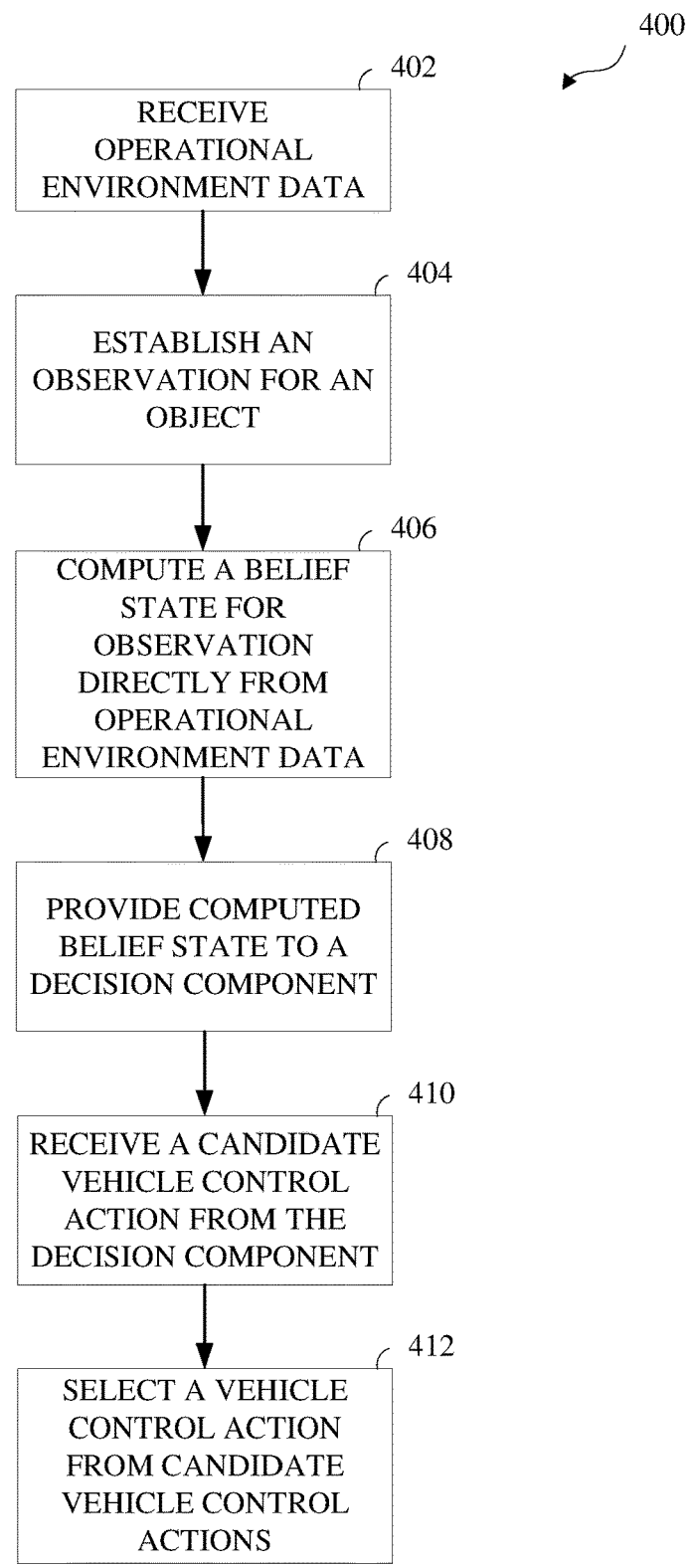
FIG. 4 is a flow chart of a method for real-time decision-making for a vehicle using belief state determination.

FIG. 4 is a flow chart of a method 400 for real-time decision-making for a vehicle using belief state determination. The method may be performed by a computer, processor, a controller, or any combination of hardware, with or without software. The method may be performed by the vehicle, such as by the processor 133, or may be performed remotely, such as by a processor or other hardware and optionally software at remote assistance support incorporating communication device 240.

At 402, operational environment data is received while the vehicle is traversing a vehicle transportation network. As described in more detail above, the operational environment data may include sensor data, such as data or information corresponding to objects external of the vehicle, such as pedestrians, remote vehicles, vehicle transportation network geometry, etc., and may include stored data, such as map data.

Figure 5:
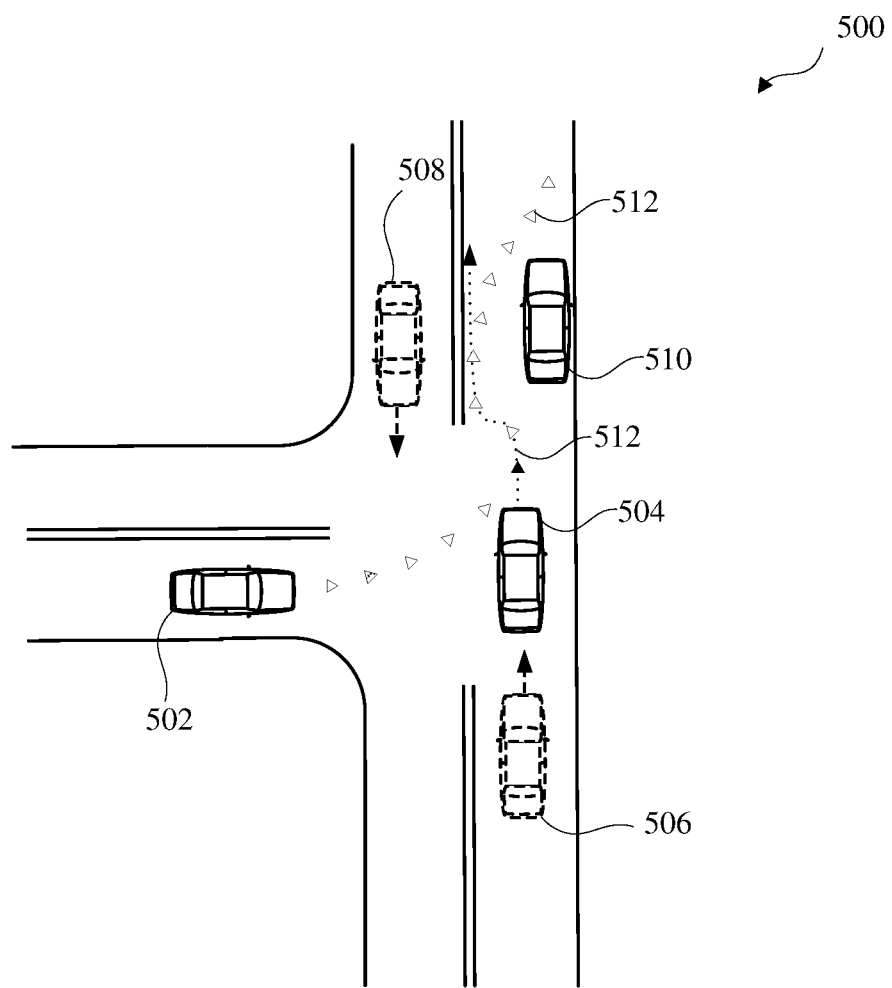
FIG. 5 is a diagram of a T-shaped intersection that is used to explain certain features of this disclosure.

For example, FIG. 5 is a diagram of a T-shaped intersection 500 of a vehicle transportation network. The vehicle 502 is traversing the T-shaped intersection 500. The operational environment data may include data associated with objects associated with the T-shaped intersection 500, such as stop signs, lane markings, etc., pedestrians, if any, and the remote vehicles 504-510. More details of the operational environment data of FIG. 5 may be seen by referring to the diagram of the autonomous vehicle operational management system 600 of FIG. 6.

Figure 6:
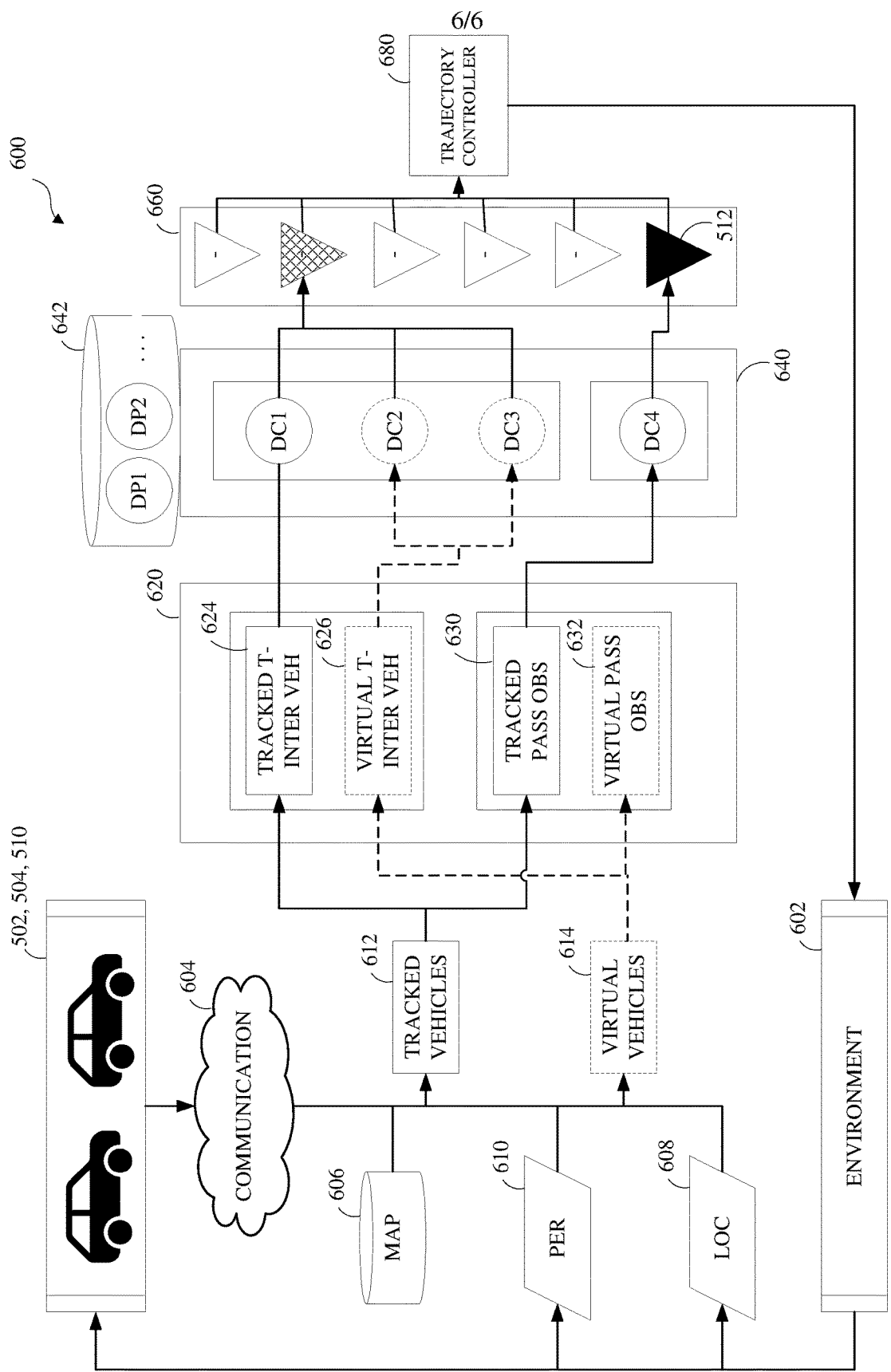
FIG. 6 is a diagram of an autonomous vehicle operational management system implementing decision-making related to the T-shaped intersection of FIG. 5.

In FIG. 6, raw perception data corresponding to the operational environment 602 in which the vehicle 502 is traveling (e.g., the received operational environment data) is shown as including data from inter-vehicle messages of one or more of the vehicles 502, 504, 510 received through one or more communication channels 604, such as described with regards to FIG. 2. The data also includes map data from one or more stored maps 606, sensed data from the operational environment 602, such as sensed location data 608 (e.g., GPS data described previously) or perceived data 610 obtained from the sensed or other received data (e.g., predicted trajectories based on headings and speed, etc.). Based on the received data, tracked objects may be identified. In FIGS. 5 and 6, the tracked objects comprise the vehicles 504, 510 (collectively referred to as the tracked vehicles 612). Tracked objects may also include virtual objects, e.g., objects that may be present but are not sensed such as due to an occlusion). In FIGS. 5 and 6, the tracked objects also include the vehicles 506, 508 (collectively referred to as the virtual vehicles 614).

In the description of the autonomous vehicle operational management system 300 above, the operational environment monitors 320 may use the raw perception data and information derived therefrom (e.g., operational environment data) to generate operational environment information comprising observations that are used to solve a SSOCEM 330. In an autonomous vehicle operational management system according to the teachings herein, such as the autonomous vehicle operational management system 600, an operational environment monitor, such as one of the operational environment monitors 620, computes a belief state or a set of belief states without a belief update as described below.

A particular operational environment monitor $M_i$ is associated with a decision component described in additional detail below. In some implementations, an operational environment monitor $M_i$ is associated with a decision process model (DPi). A decision process model DPi is a pre-defined model that corresponds to a distinct vehicle operation scenario i and may correspond to the model for a SSOCEM 330 described above. The operational environment monitor $M_i$ may output observations to a SSOCEM 330 during real-time decision-making, so that the corresponding SSOCEM 330 may continue to update its belief state. Further, the operational environment monitor $M_i$ may provide additional information such as the specific object being tracked and a belief that is computed from perception directly. This is represented by: $M_i: P_{gps} \times P_{to} \times \ldots \rightarrow (I \times \Omega_i \times \Delta^{|S|})^*$, where the probabilities are associated with an observation of the object. $P_{gps}$ is a probability based on a location perception (e.g., a GPS measurement), and $P_{to}$ is a probability based on a perception of a tracked object, etc. The result of this is a tuple of indexes $i \in I$ (I is the total number of decision components operated in real-time decision-making), observations $\omega_i \in \Omega_i$, and a belief state belongs to belief state vector $b \in \Delta^{|S|}$.

In an example of such an operational environment monitor, and referring back to FIG. 4, the operational environment monitor establishes an observation that relates the object to a distinct vehicle operation scenario at 404. For example, a distinct vehicle operation scenario may include an intersection scenario where the autonomous or semi-autonomous vehicle is approaching an intersection, a pedestrian scenario where the vehicle is traversing a portion of the vehicle transportation network that includes, or is within a defined proximity of, one or more pedestrians, such as wherein a pedestrian is crossing, or approaching, the expected path of the autonomous vehicle, a lane-change scenario where the vehicle is traversing a portion of the vehicle transportation network by changing lanes, a merge scenario where the vehicle is traversing a portion of the vehicle transportation network by merging from a first lane to a merged lane, or a pass-obstruction scenario where the vehicle is traversing a portion of the vehicle transportation network by passing an obstacle or obstruction. Other vehicle operation scenarios are possible. Further, the vehicle may traverse multiple distinct vehicle operation scenarios within a vehicle transportation network. For example, a pedestrian may approach the expected path for the vehicle while it is traversing an intersection.

An observation that relates an object to a distinct vehicle operation scenario may be any observation described above with regards to the monitors 320. In the example of FIGS. 5 and 6, the distinct vehicle operation scenario is an intersection scenario, and more specifically a T-intersection scenario, followed by a pass-obstruction scenario. Accordingly, and based on the remote or external objects shown, the operational environment monitors 620 may include a tracked T-intersection vehicle monitor 624 that may be used to generate observations and belief states for the tracked vehicle 504, a virtual T-intersection vehicle monitor 626 that may be used to generate observations and belief states for the virtual vehicles 506, 508, and a tracked pass-obstruction object monitor 630 that may be used to generate observations and belief states for the tracked vehicle 510. Although not shown in FIG. 5, another virtual object (e.g., a virtual vehicle or pedestrian) may be considered that would be blocked from the vehicle 502 by the tracked vehicle 510. Thus, FIG. 6 shows a virtual pass-obstruction object monitor 632 that may be used to generate observations and belief states for the virtual object.

Where the distinct vehicle operation scenario comprises an intersection of the vehicle transportation network, the observation may include a set of observations including an observation that the object is at the intersection, an observation that the object is inside the intersection, an observation that the object is approaching the intersection, and an observation that the object is past the intersection. Once an observation is established by the applicable operational environment monitor at 404, the operational environment monitor computes the belief state for the observation directly at 406 from the operational environment data received at 402, i.e., the raw perception. For example, computing the belief state at 406 may include computing a set of belief states, each corresponding to a respective observation of the set of observations.

The computation of the belief state may use a belief state model of the operational environment monitor. The belief state model leverages how the perception features change for an object within the particular vehicle operation scenario to directly compute a belief state from the perception features. The belief state model may be an equation that computes the belief state (e.g., a probability) using sensed values for the perception features, for example. The belief state model can thus exclude a belief state update equation.

An example of how the intersection monitor establishes an observation that relates the object to the distinct vehicle operation scenario at 404 and computes the belief state using a belief state model at 406 may be made with reference to the intersection scenario. For each object, where the object is a vehicle i, an observation $\omega(i)$ may be established at 404 as "at stop line" (equivalent to at the intersection) or "inside intersection". Then, the belief state $b(i)$ may be computed at 406 using the GPS position of the object and the geometry of the intersection using a belief state model as follows: b("at stop line")=(1−distance to "at stop line")/(distance to "at stop line"+distance to "inside intersection). Similar calculations may be made for the other observations of a set of observations of the distinct vehicle operation scenario, such as "inside intersection", "approaching intersection", "crossing intersection", and "past intersection" or "goal state".

More particularly, for example, at an n-way stop or a T-intersection, the actual belief state S may be factored as S_av×S_ov×S_g. S_av is the location of the autonomous vehicle relative to the stop line, S_ov is the location of another vehicle relative to its stop line, and S_g is the existence or non-existence of a gap based on speeds of both vehicles. The localization of the autonomous vehicle (e.g., via GPS data and a Kalman filter) may be used to compute the location belief of the autonomous vehicle b_av. The perception (also referred to as detection) system may be used to compute the probability of the other vehicle existing in that location (e.g., via perception classification accuracy from a training set), which is the other vehicle location belief b_ov. The accuracy of the prediction system (e.g., via a prediction accuracy from a training test) may be used to compute the belief b_g relative to the gap. The final computed belief state b is b=b_av*b_ov*b_g.

In another example, the belief state may be computed for a distinct vehicle operation scenario comprising a pedestrian crossing. The actual belief state S may be factored using a similar belief state model such that the actual belief state is S=S_av×S_p×S_g. The values b_av, b_p, and b_g can be computed similar to the above, with the determinations relative to a crosswalk instead of a stop line. The algorithm for detection and prediction would reflect the behavior of a pedestrian as opposed to a vehicle. The final computed belief state b is thus b=b_av*b_p*b_g.

In yet another example, the belief state may be computed for a distinct vehicle operation scenario comprising a lane change. The actual belief state S may be similarly factored, while including relative speeds such that the actual belief state S=S_av×S_avs×S_ov×S_ovs. S_avs is the relative speed of the autonomous vehicle, and S_ovs is the relative speed of the other vehicle. In computing the belief state, b_av and b_ov are computed similar to above, except that they are computed relative to the desired point of the lane change (e.g., either a point in space the lane change will be tried, or a relative point to another vehicle). The values for b_avs and b_ovs can be computed based on the accuracy of the algorithm used for speed detection. The final computed belief state is b=b_av*b_avs*b_ov*b_ovs.

A blocking monitor, such as the blocking monitor 321, may be implemented as an operational environment monitor according to the teachings herein. Instead of using the probabilities of the different predicted paths for the object to determine an observation of whether the object is blocking the autonomous or semi-autonomous vehicle or not that is provided to the decision component and subject to the belief state update, an observation that the object will block may be established, and the belief state may be computed as a probability directly using the probabilities of the different predicted paths of the object and the predicted path of the vehicle.

At 408, the operational environment monitor provides the computed belief state to a decision component implementing a policy that maps a respective belief state for the object within the distinct vehicle operation scenario to a respective candidate vehicle control action. At 410, a candidate vehicle control action is received from the policy of the decision component.

Different implementations of a decision component, and hence a policy, are possible. For example, some policy representations use a finite state controller, which does not update belief states. Instead, a finite state controller computes the transition between abstract nodes through optimization to make its own control structure. Under this variant, the raw perception may be used to describe the controller node's update. Different nodes may be defined based on the distinct vehicle operation scenario. For n-way stops and T-intersections, for example, nodes X may be defined as the union of possible conditions or observations for an object (i.e., $X = X_{empty} \cup X_{exists,noconflict} \cup X_{exists,conflict}$), such as object is not within the intersection ($X_{empty}$), the object is within the intersection but there is no conflict with the vehicle ($X_{exists,noconflict}$), and the object is not within the intersection but there is a conflict with the vehicle ($X_{exists,conflict}$). Knowing the nodes, the raw perception may be mapped to the nodes.

In some implementations where the policy is represented by a finite state controller, the computed belief state may map to a node of the finite state controller, which may be a starting node for the optimization of the finite state controller and hence for the determination of a candidate vehicle control action that is received at 410. That is, for example, where a belief is maintained, the best controller node may be computed from that belief. That is, a finite state controller algorithm computes V(x, s), which is the expected value starting in a particular node x (e.g., of the nodes X) assuming that the true underlying state is s. If provided a belief b (from any belief method, such as following Bayes' rule, etc.), the best node is given by a formula argmax_x $\Sigma$_s b(s) V(x, s). This formula weights the state-part of V(x, s) by the belief b, and finds the node x that gives the highest value.

More preferably, the decision component is a scenario-specific operational control evaluation model of the distinct vehicle operation scenario, similar to a SSOCEM 330 described above that, when solved, results in the policy. One example of how to use such decision components can be seen with reference to FIG. 6. FIG. 6 shows four decision components 640, each respectively associated with one of the tracked vehicles 612 or one of the virtual vehicles 614. The decision components 640 are instantiations of stored decision process models 642. The decision component DC1 is an instantiation of the decision process model DP1 and is associated with the tracked vehicle 524 within the intersection scenario of FIG. 5. The decision component DC1 generates a candidate vehicle control action for the vehicle 502 based on the tracked vehicle 504. The decision component DC2 is an instantiation of the decision process model DP1 and is associated with the virtual vehicle 506 within the intersection scenario of FIG. 5. The decision component DC2 generates a candidate vehicle control action for the vehicle 502 based on the virtual vehicle 506. The decision component DC3 is an instantiation of the decision process model DP1 and is associated with the virtual vehicle 508 within the intersection scenario of FIG. 5. The decision component DC3 generates a candidate vehicle control action for the vehicle 502 based on the virtual vehicle 508. The decision component DC4 is an instantiation of the decision process model DP2 and is associated with the tracked vehicle 510 within the pass-obstruction scenario of FIG. 5. The decision component DC4 generates a candidate vehicle control action for the vehicle 502 based on the tracked vehicle 510.

As explained previously with regards to the autonomous vehicle operational management system 300, a SSOCEM 330 may be solved to implement a policy that maps a respective belief state for an object within a distinct vehicle operation scenario to a respective candidate vehicle control action. In the autonomous vehicle operational management system 600, a respective observation may be established at 404 and a respective belief state may be computed at 406 for an object, and the respective belief states are used to solve respective decision components DC1, DC2, DC3, DC4 while the vehicle traverses through the intersection.

According to some implementations, the respective computed belief states may be used as the updated belief states when solving the decision components 640. For example, the computed belief state provided from the tracked T-intersection vehicle monitor 624 to the decision component DC1 may be used as the updated belief state when solving the decision component DC1 to obtain a candidate vehicle control action. The respective computed belief states associate with the virtual vehicles 506, 508 provided from the virtual T-intersection vehicle monitor 626 to the decision components DC2, DC3 may be used as the updated belief state when solving the decision components DC2, DC3 to obtain respective candidate vehicle control actions. The computed belief state provided from the tracked pass-obstacle vehicle monitor 630 to the decision component DC4 may be used as the updated belief state when solving the decision component DC4 to obtain a candidate vehicle control action.

The method 400 may include solving the decision component when, as illustrated by the example of FIG. 6, the decision components are scenario-specific operational control evaluation models instantiated while the vehicle is traversing the vehicle transportation network. The operational environment monitor may, in addition to providing the computed belief state at 408, provide the observation established at 404 to the scenario-specific operational control evaluation model. Then, the scenario-specific operational control evaluation model may be solved while the vehicle is traversing the vehicle transportation network. The solution (policy) may be obtained by updating a previous belief state maintained by the scenario-specific operational control evaluation model to an updated belief state using a belief state update equation and the observation as described above with regards to the SSOCEMs 330. For example, the belief state update equation may be Bayes' rule. Then, if the observation is invalid (e.g., the belief update divides by 0), the computed belief state may be used as (i.e., in place of) the updated belief state. Alternatively, if a difference between the updated belief state and the computed belief state is greater than a threshold difference, the computed belief state may be used as (i.e., in place of) the updated belief state. Recall, as described above, a belief state is a probability that may have a value between 0 and 1, inclusive. The threshold difference may be any value. A possible value for the threshold difference is 0.1 or less. This technique to solve the decision component may be used for each decision component of a respective vehicle operation scenario.

In an alternative technique to solve a scenario-specific operational control evaluation model instantiated while the vehicle is traversing the vehicle transportation network, the operational environment monitor may provide the observation to the model as described above. However, instead of allowing the model to solve using any belief, specific knowledge of the vehicle operational scenario may be leveraged to select a proper subset of belief states from a set of available belief states for the distinct vehicle operation scenario. Then, the scenario-specific operational control evaluation model may be solved to determine the policy while the vehicle is traversing the vehicle transportation network, responsive to the observation, using only the proper subset of belief states. For example, with n-way stop intersections, such as a 3- or 4-way stop, the solution given the state factors is $S = S_l^{av} \times S_t^{av} \times S_l^{ov} \times S_t^{ov} \times S_b^{ov} \times S_p^{ov}$, where $S_l^{av}$ represents the AV location, $S_t^{av}$ represents the time the AV is at the AV location, $S_l^{ov}$ represents the other vehicle location, $S_t^{ov}$ represents the time the other vehicle is at the other vehicle location, $S_b^{ov}$ represents whether the other vehicle is blocking, and $S_p^{ov}$ represents whether the other vehicle has priority. The associated belief states may be limited to, for example, 1.0, 0, and 0.5 to focus on the actual conditions that may occur. For example, a belief state that the other vehicle has priority is impossible where the perceived locations identify that the AV is edged into an intersection but the other vehicle is approaching the intersection. By limiting the belief states, significant reductions in calculations may be achieved, speeding up the solution of the decision component.

As described previously, a policy maps any belief state to an action. It is desirable in some implementations to execute the policy on-line (i.e., in real-time decision-making) without the need for solving a model. being generated while the vehicle is traversing the vehicle transportation network. For example, the policy may be pre-defined by selecting a proper subset of belief states from a set of available belief states for the distinct vehicle operation scenario and solving the decision component (e.g., a scenario-specific operational control evaluation model of the distinct vehicle operation scenario) using the proper subset of belief states to define the policy. The proper subset may be selected as described previously, instead of exploring all possible belief states without regard to how the perception features in the environment relate to belief states. Then, instead of doing a full backup, randomized partial belief backups may be used in a reduced set of iterations, and a backup may be performed at all selected belief states to determine candidate actions. This process leverages specific AV environment knowledge of what belief states may be achieved to speed up a solution, while storing a policy that does not require use of the decision component during execution. One way of performing this process may be found in M. T. J. Spaan and N. Vlassis, "Perseus: Randomized Point-based Value Iteration for POMDPs," Journal of Artificial Intelligence Research 24 (2005) 195-220.

At 410, the candidate vehicle control action is received from the policy of a decision component. Thereafter, at 412, a vehicle control action for traversing the vehicle transportation network is selected from any available candidate vehicle control actions. The selection of the vehicle control action may be performed in the same manner as done by the AVOMC 310 of FIG. 3.

While not expressly shown in FIG. 4, the method 400 repeats for a plurality of arbitration points while the autonomous or semi-autonomous vehicle navigates distinct vehicle operation scenarios while traversing the vehicle transportation network. In FIG. 5, the arbitration points 512 show where respective selected vehicle control actions are performed to navigate the intersection scenario and the pass-obstacle scenario. The six arbitration points 512 shown in the executor 660 of FIG. 6 extend through the intersection starting from the position of the vehicle 502 at the intersection shown in FIG. 5, to a position past the intersection, where the vehicle 502 must start to navigate about the obstacle represented by the tracked vehicle 510. One or more candidate vehicle control actions may be received according to the method 400 for each of the arbitration points 512. As shown in FIG. 6, the second arbitration point 512 of the intersection scenario receives candidate vehicle control actions from each of the decision components DC1, DC2, DC3, and the selection at 412 may be made from any of these available candidate vehicle control actions. The final arbitration point 512 of the intersection scenario, which is the first arbitration point of the pass-obstacle scenario, receives a candidate vehicle control action from the decision component DC4, and the selection at 412 is the candidate vehicle control action as the only available candidate vehicle control action.

Once the vehicle control actions are selected for each arbitration point (e.g., by the executor 660 in FIG. 6), they may be used by the vehicle to traverse the vehicle transportation network. For example, the vehicle control actions may be passed to a trajectory planner or controller 680 for execution.

As described, a policy is executed separately for each remote object. In some implementations, it may be desirable to develop a so-called family policy. The policy is represented as nodes (grouping the remote objects for a scenario), which are equivalent to sets of beliefs. Such a policy would solve the impossible observation problem, while still preventing belief state drift over time.

As used herein, the terminology "instructions" may include directions or expressions for performing any method, or any portion or portions thereof, disclosed herein, and may be realized in hardware, software, or any combination thereof. For example, instructions may be implemented as information, such as a computer program, stored in memory that may be executed by a processor to perform any of the respective methods, algorithms, aspects, or combinations thereof, as described herein. Instructions, or a portion thereof, may be implemented as a special purpose processor, or circuitry, that may include specialized hardware for carrying out any of the methods, algorithms, aspects, or combinations thereof, as described herein. In some implementations, portions of the instructions may be distributed across multiple processors on a single device, on multiple devices, which may communicate directly or across a network such as a local area network, a wide area network, the Internet, or a combination thereof.

As used herein, the terminology "example", "embodiment", "implementation", "aspect", "feature", or "element" indicates serving as an example, instance, or illustration. Unless expressly indicated, any example, embodiment, implementation, aspect, feature, or element is independent of each other example, embodiment, implementation, aspect, feature, or element and may be used in combination with any other example, embodiment, implementation, aspect, feature, or element.

As used herein, the terminology "determine" and "identify", or any variations thereof, includes selecting, ascertaining, computing, looking up, receiving, determining, establishing, obtaining, or otherwise identifying or determining in any manner whatsoever using one or more of the devices shown and described herein.

As used herein, the terminology "or" is intended to mean an inclusive "or" rather than an exclusive "or" unless specified otherwise, or clear from context. In addition, the articles "a" and "an" as used in this application and the appended claims should generally be construed to mean "one or more" unless specified otherwise or clear from context to be directed to a singular form.

Further, for simplicity of explanation, although the figures and descriptions herein may include sequences or series of steps or stages, elements of the methods disclosed herein may occur in various orders or concurrently. Additionally, elements of the methods disclosed herein may occur with other elements not explicitly presented and described herein. Furthermore, not all elements of the methods described herein may be required to implement a method in accordance with this disclosure. Although aspects, features, and elements are described herein in particular combinations, each aspect, feature, or element may be used independently or in various combinations with or without other aspects, features, and elements.

The above-described aspects, examples, and implementations have been described in order to allow easy understanding of the disclosure are not limiting. On the contrary, the disclosure covers various modifications and equivalent arrangements included within the scope of the appended claims, which scope is to be accorded the broadest interpretation so as to encompass all such modifications and equivalent structure as is permitted under the law.

What is claimed is:

1. An apparatus for real-time decision-making for a vehicle using belief state determination, the apparatus comprising:
   a processor configured to:
      receive, while the vehicle is traversing a vehicle transportation network, operational environment data, wherein the operational environment data includes data associated with an object external to the vehicle;
      establish, using an operational environment monitor, an observation that relates the object to a distinct vehicle operation scenario;
      compute, using a belief state model of the operational environment monitor, a belief state for the observation directly from the operational environment data;
      provide, from the operational environment monitor, the computed belief state to a decision component implementing a policy that maps a respective belief state for the object within the distinct vehicle operation scenario to a respective candidate vehicle control action;
      receive, from the policy of the decision component, a candidate vehicle control action; and
      select, for traversing the vehicle transportation network, a vehicle control action from any available candidate vehicle control actions.

2. The apparatus of claim 1, wherein the belief state model of the operational environment monitor excludes a belief state update equation.

3. The apparatus of claim 1, wherein:
   the distinct vehicle operation scenario comprises an intersection of the vehicle transportation network;
   the observation comprises a set of observations including an observation that the object is at the intersection, an observation that the object is inside the intersection, an observation that the object is approaching the intersection, and an observation that the object is past the intersection; and
   to compute the belief state for the observation comprises to compute a set of belief states, each corresponding to a respective observation of the set of observations.

4. The apparatus of claim 1, wherein:
   the decision component is a scenario-specific operational control evaluation model of the distinct vehicle operation scenario that, when solved, results in the policy; and
   the processor is configured to:
      provide, from the operational environment monitor, the observation to the scenario-specific operational control evaluation model; and
      solve the scenario-specific operational control evaluation model while the vehicle is traversing the vehicle transportation network, wherein to solve the scenario-specific operational control evaluation model comprises to:
         update a previous belief state maintained by the scenario-specific operational control evaluation model to an updated belief state using a belief state update equation and the observation; and
         if one of the observation is invalid or a difference between the updated belief state and the computed belief state is greater than a threshold difference, use the computed belief state in place of the updated belief state.

5. The apparatus of claim 1, wherein:
   the decision component is a scenario-specific operational control evaluation model of the distinct vehicle operation scenario that, when solved, results in the policy; and
   the processor is configured to:
      provide, from the operational environment monitor, the observation to the scenario-specific operational control evaluation model;
      select a proper subset of belief states from a set of available belief states for the distinct vehicle operation scenario; and
      solve the scenario-specific operational control evaluation model to determine the policy while the vehicle is traversing the vehicle transportation network, responsive to the observation, using only the proper subset of belief states.

6. The apparatus of claim 1, wherein the policy is predefined by:
   selecting a proper subset of belief states from a set of available belief states for the distinct vehicle operation scenario; and solving a scenario-specific operational control evaluation model of the distinct vehicle operation scenario using the proper subset of belief states to define the policy.

7. The apparatus of claim 1, wherein the policy is represented by a finite state controller, and the computed belief state maps to a node of the finite state controller.

8. The apparatus of claim 1, wherein:
the decision component comprises a Partially Observable Markov Decision Process model.

9. The apparatus of claim 1, wherein the operational environment monitor comprises a blocking monitor configured to compute the belief state as a probability that the object will block a predicted path of the vehicle.

10. A method for real-time decision-making for a vehicle using belief state determination, the method comprising:
receiving, while the vehicle is traversing a vehicle transportation network, operational environment data, wherein the operational environment data includes data associated with an object external to the vehicle;
establishing, using an operational environment monitor, an observation that relates the object to a distinct vehicle operation scenario;
computing, using a belief state model of the operational environment monitor, a belief state for the observation directly from the operational environment data;
providing, from the operational environment monitor, the computed belief state to a decision component implementing a policy that maps a respective belief state for the object within the distinct vehicle operation scenario to a respective candidate vehicle control action;
receiving, from the policy of the decision component, a candidate vehicle control action; and
selecting, for traversing the vehicle transportation network, a vehicle control action from any available candidate vehicle control actions.

11. The method of claim 10, wherein the belief state model of the operational environment monitor excludes a belief state update equation.

12. The method of claim 10, wherein:
the operational environment monitor comprises a blocking monitor; and
computing the belief state comprises computing the belief state as a probability that the object will block a predicted path of the vehicle.

13. The method of claim 10, wherein:
the decision component is a scenario-specific operational control evaluation model of the distinct vehicle operation scenario that, when solved, results in the policy; and the method comprises:
providing, from the operational environment monitor, the observation to the scenario-specific operational control evaluation model; and
solving the scenario-specific operational control evaluation model while the vehicle is traversing the vehicle transportation network, wherein solving the scenario-specific operational control evaluation model comprises:
updating a previous belief state maintained by the scenario-specific operational control evaluation model to an updated belief state using a belief state update equation; and
if one of the observation is invalid or a difference between the updated belief state and the computed belief state is greater than a threshold difference, using the computed belief state in place of the updated belief state, and otherwise using the updated belief state.

14. The method of claim 10, wherein:
the decision component is a scenario-specific operational control evaluation model of the distinct vehicle operation scenario that, when solved, results in the policy; and the method comprises:
providing, from the operational environment monitor, the observation to the scenario-specific operational control evaluation model;
selecting a proper subset of belief states from a set of available belief states for the distinct vehicle operation scenario; and
solving the scenario-specific operational control evaluation model to determine the policy while the vehicle is traversing the vehicle transportation network, responsive to the observation, using only the proper subset of belief states.

15. The method of claim 10, further comprising:
pre-defining the policy by:
selecting a proper subset of belief states from a set of available belief states for the distinct vehicle operation scenario; and
solving a scenario-specific operational control evaluation model of the distinct vehicle operation scenario using the proper subset of belief states to define the policy.

16. The method of claim 10, wherein the policy is represented by a finite state controller, and the computed state belief maps to a node of the finite state controller.

17. A vehicle implementing real-time decision-making using belief state determination, the vehicle comprising:
a processor configured to:
receive, while the vehicle is traversing a vehicle transportation network, operational environment data, wherein the operational environment data includes data associated with an object external to the vehicle;
establish, using an operational environment monitor, an observation that relates the object to a distinct vehicle operation scenario;
compute, using a belief state model of the operational environment monitor, a belief state for the observation directly from the operational environment data;
provide, from the operational environment monitor, the computed belief state to a decision component implementing a policy that maps a respective belief state for the object within the distinct vehicle operation scenario to a respective candidate vehicle control action;
receive, from the policy of the decision component, a candidate vehicle control action; and
select, for traversing the vehicle transportation network, a vehicle control action from any available candidate vehicle control actions.

18. The vehicle of claim 17, wherein the belief state model of the operational environment monitor excludes a belief state update equation.

19. The vehicle of claim 17, wherein:
the decision component is a scenario-specific operational control evaluation model of the distinct vehicle operation scenario that, when solved, results in the policy; and
the processor is configured to:
provide, from the operational environment monitor, the observation to the scenario-specific operational control evaluation model; and
solve the scenario-specific operational control evaluation model while the vehicle is traversing the vehicle transportation network, wherein to solve the scenario-specific operational control evaluation model comprises to:
  update a previous belief state maintained by the scenario-specific operational control evaluation model to an updated belief state using a belief state update equation; and
  if one of the observation is invalid or a difference between the updated belief state and the computed belief state is greater than a threshold difference, use the computed belief state in place of the updated belief state.
20. The vehicle of claim 17, further comprising:
a trajectory controller configured to execute the vehicle control action.

* * * * *